(12) United States Patent
Sloan et al.

(10) Patent No.: US 7,262,770 B2
(45) Date of Patent: Aug. 28, 2007

(54) GRAPHICS IMAGE RENDERING WITH RADIANCE SELF-TRANSFER FOR LOW-FREQUENCY LIGHTING ENVIRONMENTS

(75) Inventors: Peter-Pike J. Sloan, Bellevue, WA (US); John M. Snyder, Redmond, WA (US); Jan Kautz, Saarbrucken (DE)

(73) Assignee: Microsoft Corporation, Redmond, WA (US)

( * ) Notice: Subject to any disclaimer, the term of this patent is extended or adjusted under 35 U.S.C. 154(b) by 439 days.

(21) Appl. No.: 10/389,553

(22) Filed: Mar. 14, 2003

(65) Prior Publication Data

US 2003/0179197 A1 Sep. 25, 2003

Related U.S. Application Data

(60) Provisional application No. 60/366,920, filed on Mar. 21, 2002.

(51) Int. Cl.
*G06T 15/50* (2006.01)
(52) U.S. Cl. ...................... 345/426; 345/419
(58) Field of Classification Search ................ 345/426, 345/419, 420
See application file for complete search history.

(56) References Cited

U.S. PATENT DOCUMENTS

| 5,710,876 | A | * | 1/1998 | Peercy et al. ............... 345/426 |
| 2003/0030639 | A1 | * | 2/2003 | Ritter ......................... 345/426 |

OTHER PUBLICATIONS

Foley et al., "Computer Graphics: Principles and Practice", 2nd ed in C, 1996, pp. 758-766, 775-779.*

Hall, Roy. "Illumination and Color in Computer Generated Imagery", Springer-Verlag, 1989, pp. 99-103.*

Hausner, A., "Multipole Expansion of the Light Vector," IEEE Transactions on Visualization and Comp. Graphics 3(1) (Jan.-Mar. 1997), pp. 12-22).*

Watt et al., "Advanced Animation and Rendering Techniques", ACM-Press 1992, ch 12 (pp. 286-296).*

Rui Bastos, Kenneth Hoff, William Wynn, and Anselmo Lastra-"Increased Photorealism for Interactive Architectural Walkthroughs", University of North Carolina at Chapel Hill, 1999 Symposium on Interactive 3D Graphics Atlanta GA, USA.*

Michael Ashikhmin and Peter Shirley, "Steerable Illumination Textures", ACM Transactions on Graphics (TOG), vol. 21, Issue 1, pp. 1-19, Published in 2002.*

(Continued)

*Primary Examiner*—Mark Zimmerman
*Assistant Examiner*—Daniel Hajnik
(74) *Attorney, Agent, or Firm*—Klarquist Sparkman, LLP

(57) ABSTRACT

Real-time image rendering of diffuse and glossy objects in low-frequency lighting environments captures soft shadows, interreflections, and caustics. As a preprocess, a global transport simulator creates functions over the object's surface representing transfer of arbitrary, low-frequency source lighting into exiting radiance, but including global effects like shadowing and interreflection from the object onto itself. At run-time, these transfer functions are applied to the actual source lighting. Dynamic, local lighting is handled by sampling close to the object at every frame; the object can also be rigidly rotated with respect to the lighting and vice versa. Lighting and transfer functions are represented using low-order spherical harmonics. Functions for radiance transfer from a dynamic lighting environment through a preprocessed object to neighboring points in space further allow cast soft shadows and caustics from rigidly moving casters onto arbitrary, dynamic receivers.

30 Claims, 11 Drawing Sheets
(3 of 11 Drawing Sheet(s) Filed in Color)

OTHER PUBLICATIONS

Agrawala et al., "Efficient Image-Based Methods for Rendering Soft Shadows", *SIGGRAPH 2000*, pp. 375-384.

Airey et al., "Towards Image Realism with Interactive Update Rates in Complex Virtual Building Environments", *1990 Symposium on Interactive 3-D Graphics*, 24(2), pp. 41-50.

Cabral et al., Bidirectional Reflection Functions From Surface Bump Maps, *SIGGRAPH 1987*, pp. 273-281.

Cabral et al., "Reflection Space Image Based Rendering," *SIGGRAPH 1999*, pp. 165-170.

Cohen et al., "Radiosity and Realistic Image Synthesis", *Academic Press Professional*, Cambridge, 1993.

Cook et al., "Distributed Ray Tracing", *SIGGRAPH 1984*, pp. 137-146.

Debevec, "Rendering Synthetic Objects into Real Scenes: Bridging Traditional and Image-Based Graphics with Global Illumination and High Dynamic Range Photography", *SIGGRAPH 1998*, pp. 189-798.

Debevec et al., "Acquiring the Reflectance Field of a Human Face", *SIGGRAPH 2000*, pp. 145-156.

Dobashi et al., "A Quick Rendering Method Using Basis Functions for Interactive Lighting Design", *Eurographics 1995*, pp. 229-240.

Dorsey et al., "Design and Simulation of Opera Lighting and Projection Effects", *SIGGRAPH 1991*, pp. 41-50.

D'Zmura, "Shading Ambiguity: Reflection and Illumination", *Computational Models of Visual Processing* (1991)*Landy and Movshon, eds., MIT Press*, Cambridge, pp. 187-207.

Edmonds, "Angular Momentrum in Quantum Mechanics", *Princeton University*, Princteon, 1960.

Greene, "Environment Mapping and Other Applications of World Projections", *IEEE CG&A*, 1986, 6(11), pp. 21-29.

Greger et al., "The Irradiance Volume", *IEEE Computer Graphics and Applications 1986*, 6(11) pp. 21-29.

Hakura et al., "Realistic Reflections and Refractions on Graphics Hardware with Hybrid Rendering and Layered Environment Maps", *Eurographics Workshop on Rendering*, 2001, pp. 289-300.

Haeberli et al., "The Accumulation Buffer: Hardware Support for High Quality Rendering", *SIGGRAPH 1990*, pp. 309-318.

Heidrich et al., "Light Field Techniques for Reflections and Refractions", *Eurographics Rendering Workshop 1999*, pp. 195-375.

Heidrich et al., "Realistic, Hardware-Accelerated Shading and Lighting", *SIGGRAPH 1999*, pp. 171-178.

Heidrich, et al., "Illuminating Micro Geometry Based on Precomputed Visibility", *SIGGRAPH 2000*, pp. 455-464.

Jensen, "Global Illumination Using Photon Maps", *Eurographics Workshop on Rendering 1996*, 21-30.

Kautz et al., "Fast, Arbitrary BRDF Shading for Low-Frequency Lighting Using Spherical Harmonics", © The Eurographics Association 2002, *Thirteenth Eurographics Workshop on Rendering* (2002).

Kautz et al., "Interactive Rendering with Arbitrary BRDFs Using Separable Approximations", *Eurographics Workshop on Rendering 1999*, 247-260.

Kautz et al., "A Unified Approach to Pre-filtered Environment Maps", *Eurographics Workshop on Rendering 2000*, pp. 185-196.

Kajiya, "The Rendering Equation", *SIGGRAPH 1986*, pp. 143-150.

Keating et al., "Shadow Penumbras for Complex Objects by Depth-Dependent Filtering of Multi-Layer Depth Images", *Eurographics Rendering Workshop*, 1996, pp. 205-220.

Keller, "Instant Radiosity", *SIGGRAPH 1997*, pp. 49-56.

Larson et al., "Indirect Calculation", *Rendering with Radiance, Morgan Kaufmann Publishers*, 1998, Chapter 12, pp. 523-562.

Linde et al., "An Algorithm for Vector Quantizer Design", *IEEE Transactions on Communication COM—28*, 1980, 84-95.

Lokovic, "Deep Shadow Maps", *SIGGRAPH 2000*, pp. 385-392.

Malzbender et al., "Polynomial Texture Maps", *SIGGRAPH 2001*, pp. 519-528.

Max, "Horizontal Mapping: Shadows for Bump-Mapped Surfaces", *The Visual Computer*, Jul. 1998, pp. 109-117.

Miller, "Efficient Algorithms for Local and Global Accessibility Shading", *SIGGRAPH 1994*, pp. 319-326.

Nimeroff et al., "Efficient Re-rendering of Natural Environments", *Eurographics Workshop on Rendering 1994*, pp. 359-373.

Ramamoorthi et al., "An Efficient Representation for Irradiance Environment Maps", *SIGGRAPH 2001*, pp. 497-500.

Reeves et al., "Rendering Antialiased Shadows with Depth Maps", *SIGGRAPH 1987*, pp. 283-291.

Segal et al., "Fast Shadows and Lighting Effects Using Texture Mapping", *SIGGRAPH 1992*, pp. 249-252.

Schroder et al., "Spherical Wavelets: Efficiently Representing the Sphere", *SIGGRAPH 1995*, pp. 161-172.

Sillion et al., "A Global Illumination Solution for General Reflectance Distributions", *SIGGRAPH 1991*, pp. 187-196.

Soler et al., "Fast Calculation of Soft Shadow Textures Using Convolution", *SIGGRAPH 1998*, pp. 321-332.

Teo et al., "Efficient Linear Re-Rendering for Interactive Lighting Design", Oct. 1997 Report No. STAN-CS-TN-97-60, *Stanford University*.

Ward et al., "A Ray Tracing Solution for Diffuse Interreflection", *SIGGRAPH 1988*, pp. 85-92.

Westin et al., "Predicting Reflectance Functions from Complex Surfaces", *SIGGRAPH 1992*, pp. 255-264.

Williams, "Casting Curved Shadows on Curved Surfaces", *SIGGRAPH 1978*, pp. 270-274.

Zare, "Angular Momentum: Understanding Spatial Aspects in Chemistry and Physics", Wiley, New York, 1987.

Kautz et al., "Fast, Arbitrary BRDF Shading for Low-Frequency Lighting Environments Using Spherical Harmonics", *Thirteenth Eurographics Workshop on Rendering 2002*.

Cohen et al., "Radiosity and Realistic Image Synthesis", pp. 13-106*Morgan Kaufmann Publishers, Inc.*, San Francisco, 1993.

* cited by examiner

Figure 8
UNSHADOWED
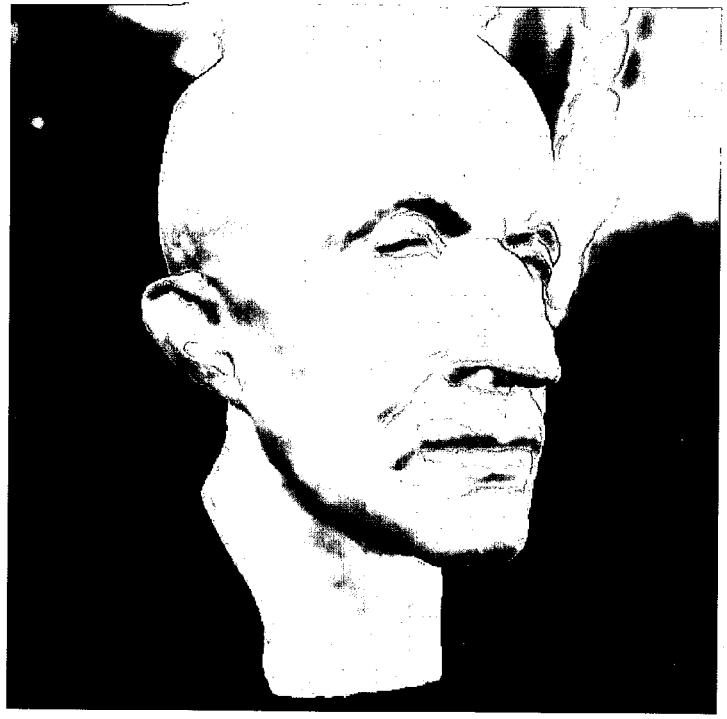
RADIANCE SELF-
TRANSFER

Figure 9
DIFFUSE SURFACE
SELF-TRANSFER
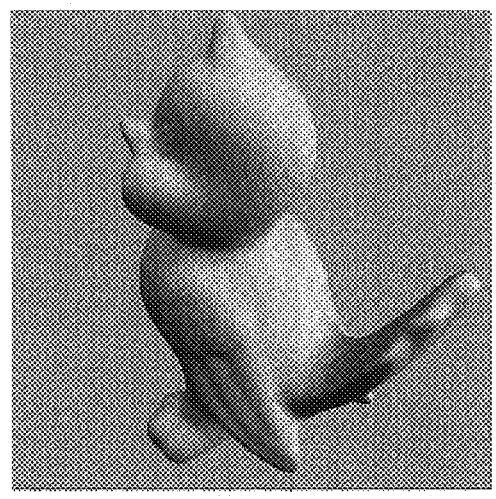
UNSHADOWED
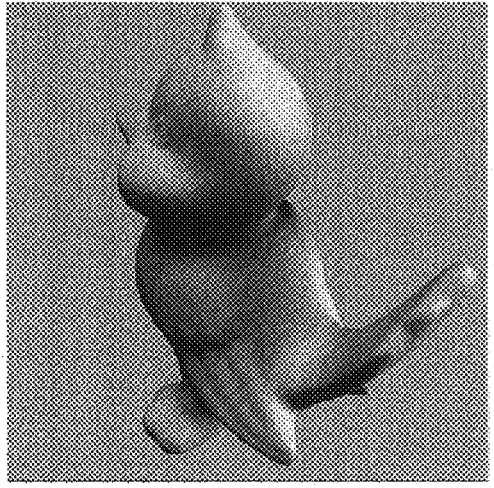
SHADOWED
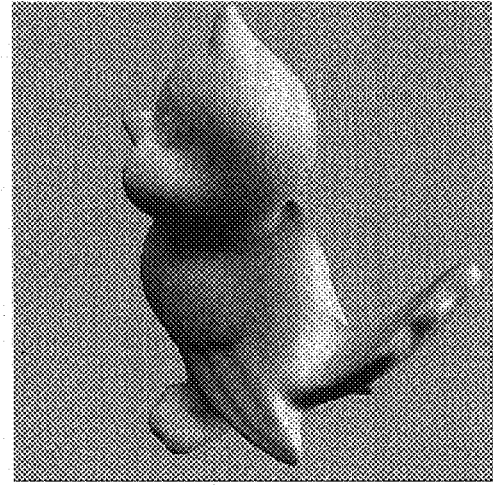
INTERREFLECTED

GLOSSY SURFACE
SELF-TRANSFER

UNSHADOWED

SHADOWED

INTERREFLECTED

Figure 11
SAMPLING INCIDENT RADIANCE AT ICP POINTS
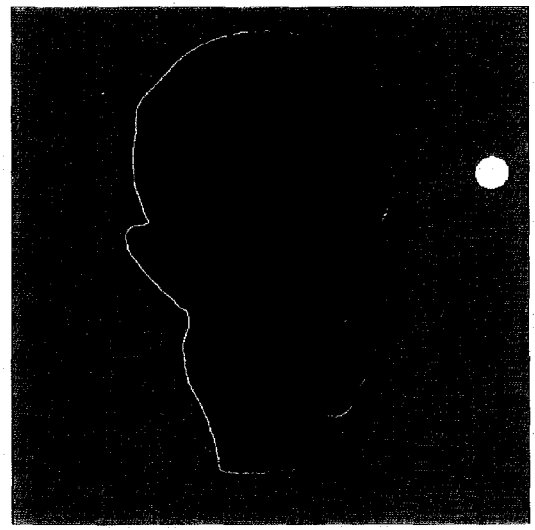
SINGLE SAMPLE
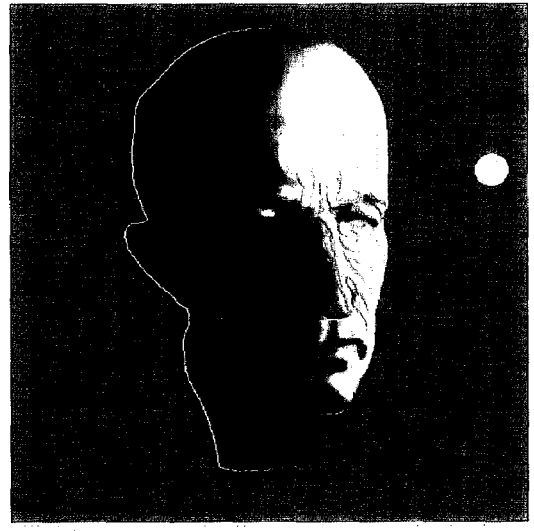
MULTIPLE SAMPLES
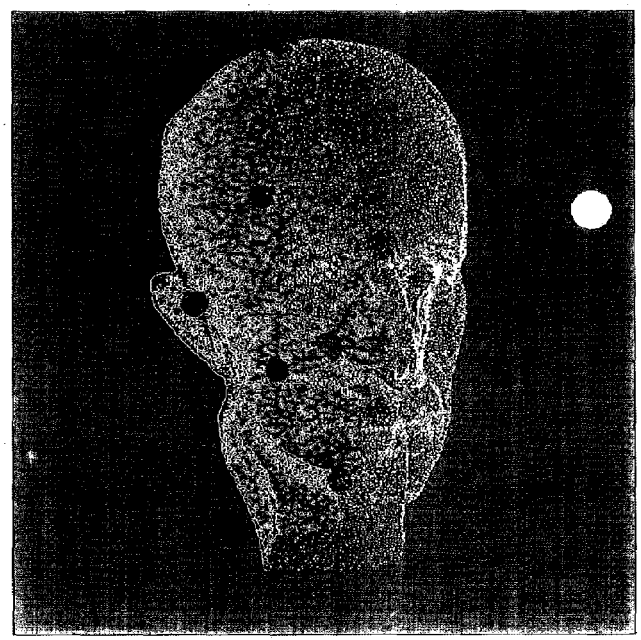
ICP POINTS

VOLUMETRIC SELF-TRANSFER

NEIGHBORHOOD SELF-TRANSFER

GRAPHICS IMAGE RENDERING WITH RADIANCE SELF-TRANSFER FOR LOW-FREQUENCY LIGHTING ENVIRONMENTS

RELATED APPLICATIONS

This application claims priority from U.S. Provisional Patent Application No. 60/366,920, filed Mar. 21, 2002.

COPYRIGHT AUTHORIZATION

A portion of the disclosure of this patent document contains material which is subject to copyright protection. The copyright owner has no objection to the facsimile reproduction by any one of the patent disclosure, as it appears in the Patent and Trademark Office patent files or records, but otherwise reserves all copyright rights whatsoever.

TECHNICAL FIELD

The present invention relates to computer graphics image rendering techniques, and more particularly relates to lighting and shadowing of a modeled object in the rendered image.

BACKGROUND

Lighting from area sources, soft shadows, and interreflections are important effects in realistic image synthesis. Unfortunately, general methods for integrating over large-scale lighting environments, including Monte Carlo ray tracing, radiosity, or multi-pass rendering that sums over multiple point light sources, are impractical for real-time rendering. (Monte Carlo ray tracing is described by, *inter alia*, Cook, R, Porter, T, and Carpenter, L, Distributed Ray Tracing, SIGGRAPH '84, 137-146; Jensen, H, Global Illumination using Photon Maps, Eurographics Workshop on Rendering 1996, 21-30; and Kajiya, J, The Rendering Equation, SIGGRAPH '86, 143-150.) (A radiosity technique is described in Cohen, M, and Wallace, J, Radiosity and Realistic Image Synthesis, Academic Press Professional, Cambridge, 1993.) (Various multi-pass rendering techniques are described by, *inter alia*, Haeberli, P, and Akeley, K, The Accumulation Buffer: Hardware Support for High-Quality Rendering, SIGGRAPH '90, 309-318; Keller, A, Instant Radiosity, SIGGRAPH '97, 49-56; and Segal, M, Korobkin, C, van Widenfelt, R, Foran, J, and Haeberli, P, Fast Shadows and Lighting Effects Using Texture Mapping, SIGGRAPH '92, 249-252.)

Real-time, realistic global illumination encounters three difficulties—it must model the complex, spatially-varying bi-directional reflectance distribution functions (BRDFS) of real materials (BRDF complexity), it requires integration over the hemisphere of lighting directions at each point (light integration), and it must account for bouncing/occlusion effects, like shadows, due to intervening matter along light paths from sources to receivers (light transport complexity). Much research has focused on extending BRDF complexity (e.g., glossy and anisotropic reflections), solving the light integration problem by representing incident lighting as a sum of directions or points. Light integration thus tractably reduces to sampling an analytic or tabulated BRDF at a few points, but becomes intractable for large light sources. A second line of research samples radiance and pre-convolves it with kernels of various sizes. (See, e.g., Cabral, B, Olano, M, and Nemec, P, Reflection Space Image Based Rendering, SIGGRAPH '99,165-170; Greene, N, Environment Mapping and Other applications of World Projections, IEEE CG&A, 6(11):21-29,1986; Heidrich, W, Seidel H, Realistic, Hardware-Accelerated Shading and Lighting, SIGGRAPH '99, 171-178; Kautz, J, Vazquez, P, Heidrich, W, and Seidel, H, A Unified Approach to Pre-filtered Environment Maps, Eurographics Workshop on Rendering 2000, 185-196; and Ramamoorthi, R, and Hanrahan, P, An Efficient Representation for Irradiance Environment Maps, SIGGRAPH '01, 497-500.) This solves the light integration problem but ignores light transport complexities like shadows since the convolution assumes the incident radiance is unoccluded and unscattered. Finally, clever techniques exist to extend complexity of light transport, especially shadows. Light integration becomes the problem; almost all these techniques are unsuitable for very large light sources.

SUMMARY

A real-time image rendering technique described herein better accounts for light integration and light transport complexity in real-time. This technique focuses on low-frequency lighting environments, using a low-order spherical harmonic (SH) basis to represent such environments efficiently without aliasing. An aspect of the technique is to represent how an object scatters this light onto itself or its neighboring space, in a way that decouples the scattering from the incident lighting. For example, FIG. 8 compares an unshadowed image of a modeled man's head with an image produced as described herein with radiance self-transfer.

To briefly summarize the described technique, assume initially we have a convex, diffuse object lit by an infinitely distant environment map. The object's shaded "response" to its environment can be viewed as a transfer function, mapping incoming to outgoing radiance, which in one case simply performs a cosine-weighted integral. A more complex integral captures how a concave object shadows itself, where the integrand is multiplied by an additional transport factor representing visibility along each direction.

The described technique's approach is to precompute for a given object the expensive transport simulation required by complex transfer functions like shadowing.

The resulting transfer functions are represented as a dense set of vectors or matrices over its surface. Meanwhile, incident radiance need not be precomputed. During later real-time rendering, the graphics hardware can dynamically sample incident radiance at a limited number of points, which the technique converts to the spherical harmonic (SH) basis with a fast calculation. Analytic models, such as skylight models or simple geometries like circles, can also be used.

By representing both incident radiance and transfer functions in the SH basis, the described technique reduces the light integral to a simple dot product between their coefficient vectors (diffuse receivers) or a simple linear transform of the lighting coefficient vector through a small transfer matrix (glossy receivers). Low-frequency lighting environments require very few coefficients (9-25), enabling graphics hardware to compute the result in a single pass. Unlike Monte-Carlo and multi-pass light integration methods, the run-time computation with this technique can be kept constant no matter how many or how big the light sources.

Keeping a constant amount of run-time computation relies on large-scale, smooth lighting to limit the number of SH coefficients necessary.

The described technique represents complex transport effects like interreflections and caustics in the transfer function. Since these are all simulated as a preprocess, only the transfer function's basis coefficients change, not the run-time computation. The approach of the described technique handles both surface and volume-based geometry. With more SH coefficients, the technique can even handle glossy (but not highly specular) receivers as well as diffuse, including interreflection. For example, 25 SH coefficients suffice for useful glossy effects. In addition to transfer from a rigid object to itself, called self-transfer, the technique generalizes to neighborhood-transfer from a rigid object to its neighboring space, allowing cast soft shadows, glossy reflections, and caustics on dynamic receivers.

BRIEF DESCRIPTION OF THE DRAWINGS

The file of this patent application contains at least one drawing/photograph executed in color. Copies of this patent with color drawing(s)/photograph(s) will be provided by the Office upon request and payment of the necessary fee.

FIG. 8 depicts images produced both unshadowed and via the real-time rendering of FIG. 3.

FIG. 9 depicts images produced both unshadowed and via the real-time rendering of FIG. 3, which illustrate effects of diffuse surface self-transfer.

FIG. 11 depicts images produced via the real-time rendering of FIG. 3 with incident radiance sampled at a single point, iterated closest point algorithm (ICP) points, and multiple samples, respectively.

DETAILED DESCRIPTION

Figure 1:
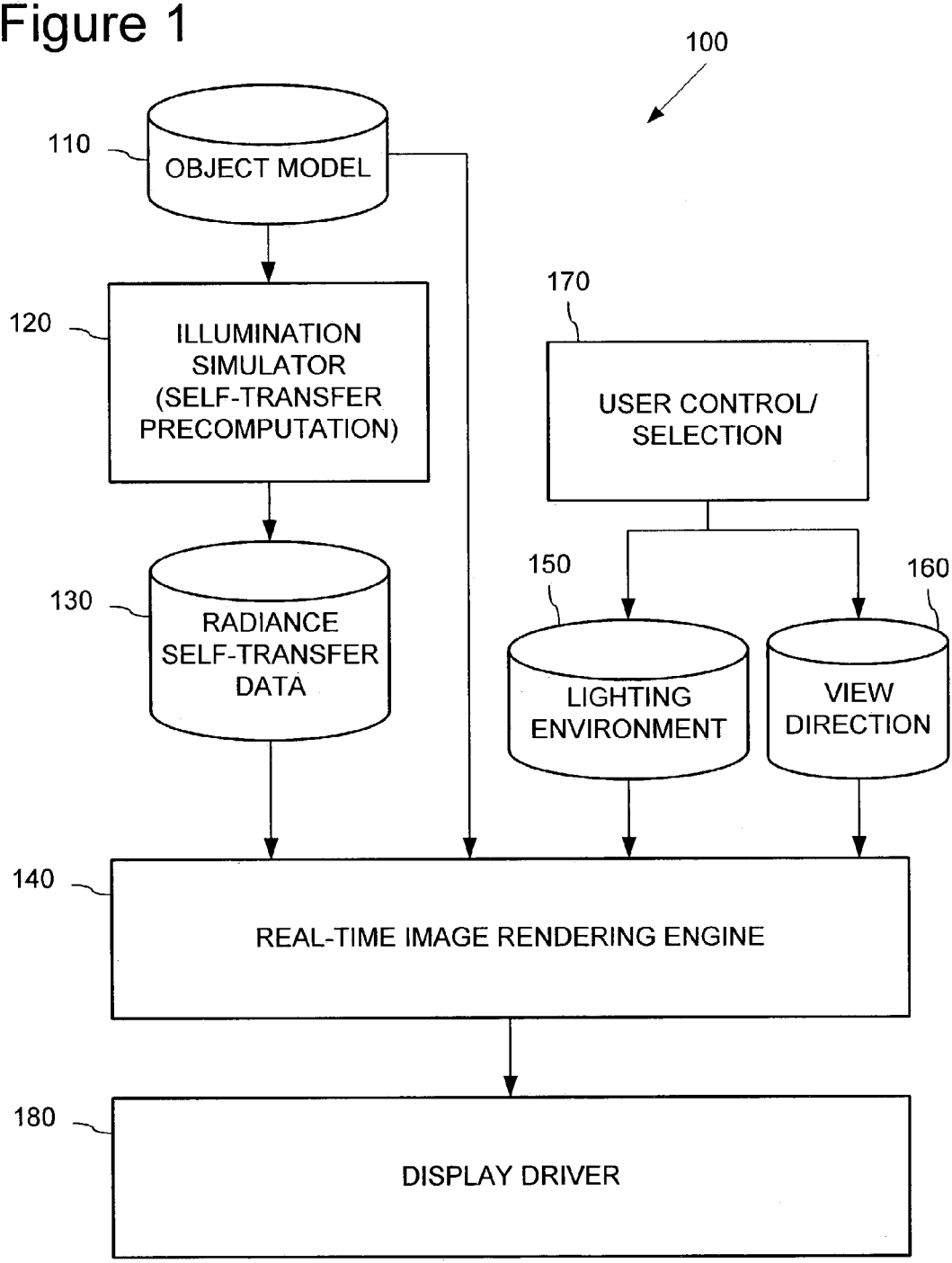
FIG. 1 is a block diagram of a computer graphics software architecture incorporating pre-computed radiance self-transfer for real-time image rendering in dynamic, low-frequency lighting environments.

With reference to FIG. 1, a software architecture of a computer graphics image rendering system 100 provides real-time image rendering of a modeled object with inter-reflection and self-shadowing using a radiance self-transfer image rendering technique described herein. In general, the software architecture includes a global illumination simulator 120, a real-time image rendering engine 140, and a graphics display driver 180. In the radiance self-transfer rendering technique described more fully below, the global illumination simulator 120 performs a pre-processing stage of the technique, which precomputes radiance self-transfer data 140 from a geometric object model 110. The geometric model 110 can be a triangulated mesh, wavelet composition, or any other representation of the geometry of the object being modeled. The real-time rendering engine 140 then uses the precomputed radiance self-transfer data to render images of the modeled object for a dynamically variable lighting environment 150 and viewing direction 160, which can be selectively varied or set with user controls 170. The graphics display driver 180 outputs the images to an image output device (e.g., to a monitor, projector, printer or like).

In some embodiment of the graphics image rendering system, the radiance self-transfer precomputation of simulator 120 and image rendering by the engine 140 can be implemented on a single computer, such as that described in Section 6, Computing Environment, below. More generally, the simulator 120 can be run on a separate computer, and the resulting data then.transferred to the computer on which the rendering engine 140 runs to produce the graphics images.

Radiance Self Transfer Technique Overview. As a preprocess, the global illumination simulator 120 runs an illumination simulation over the model 110 that captures how the modeled object shadows and scatters light onto itself. The result is recorded in the radiance self-transfer data 130 as a dense set of vectors (diffuse case) or matrices (glossy case) over the model. At image rendering-time, the rendering engine 140 projects incident radiance for the lighting environment 150 to the spherical harmonic (SH) basis (described below). The model's field of transfer vectors or matrices is then applied to the lighting's coefficient vector. If the object is diffuse, a transfer vector at points on the object is dotted with the lighting's coefficients to produce correctly self-scattered shading. If the object is glossy, a transfer matrix is applied to the lighting coefficients to produce the coefficients of a spherical function representing self-scattered incident radiance at the points. This function is convolved with the object's bi-directional reflectance distribution function (BRDF) and then evaluated at the view-dependent reflection direction to produce the final shading for the object in the image being rendered.

1. Review of Spherical Harmonics

Definition. Spherical harmonics define an orthonormal basis over the sphere, S, analogous to the Fourier transform over the 1D circle. Using the parameterization $$s=(x, y, z)=(\sin \theta \cos \phi, \sin \theta \sin \phi, \cos \theta),$$

the basis functions are defined as $$Y_l^m(\theta,\varphi) = K_l^m e^{im\varphi} P_l^{|m|}(\cos\theta), l \in N, \ -l \le m \le l$$

where $P_l^m$ are the associated Legendre polynomials and $K_l^m$ are the normalization constants $$K_l^m = \sqrt{\frac{(2l+1)}{4\pi}\frac{(l-|m|)!}{(l+|m|)!}}.$$

The above definition forms a complex basis; a real-valued basis is given by the simple transformation $$y_l^m = \begin{cases} \sqrt{2}\, \mathrm{Re}(Y_l^m), & m > 0 \\ \sqrt{2}\, \mathrm{Im}(Y_l^m), & m < 0 \\ Y_l^0, & m = 0 \end{cases} = \begin{cases} \sqrt{2}\, K_l^m \cos(m\varphi) P_l^m(\cos\theta), & m > 0 \\ \sqrt{2}\, K_l^m \sin(-m\varphi) P_l^{-m}(\cos\theta), & m < 0 \\ K_l^0 P_l^0(\cos\theta), & m = 0 \end{cases}$$

Low values of l (called the band index) represent low-frequency basis functions over the sphere. The basis functions for band l reduce to polynomials of order l in x, y, and z. Evaluation can be done with simple recurrence formulas. (See, e.g., Edmonds, A, Angular Momentum in Quantum Mechanics, Princeton University, Princeton, 1960; and Zare, R, Angular Momentum: Understanding Spatial Aspects in Chemistry and Physics, Wiley, N.Y., 1987.)

Projection and Reconstruction. Because the SH basis is orthonormal, a scalar function f defined over S can be projected into its coefficients via the integral $$f_l^m = \int f(s) y_l^m(s) ds \qquad (1)$$

These coefficients provide the n-th order reconstruction function $$\tilde{f}(s) = \sum_{l=0}^{n-1} \sum_{m=-l}^{l} f_l^m y_l^m(s) \qquad (2)$$

which approximates f increasingly well as the number of bands n increases. Low-frequency signals can be accurately represented with only a few SH bands. Higher frequency signals are bandlimited (i.e., smoothed without aliasing) with a low-order projection.

Projection to n-th order involves $n^2$ coefficients. It is often convenient to rewrite (2) in terms of a singly-indexed vector of projection coefficients and basis functions, via $$\tilde{f}(s) = \sum_{i=1}^{n^2} f_i y_i(s) \qquad (3)$$

where $i = l(l+1) + m + 1$. This formulation makes it obvious that evaluation at s of the reconstruction function represents a simple dot product of the $n^2$-component coefficient vector $f_i$ with the vector of evaluated basis functions $y_i(s)$.

Basic Properties. A property of SH projection is its rotational invariance; that is, given $g(s) = f(Q(s))$ where Q is an arbitrary rotation over S then $$\tilde{g}(s) = \tilde{f}(Q(s)) \qquad (4)$$

This is analogous to the shift-invariance property of the 1D Fourier transform. Practically, this property means that SH projection causes no aliasing artifacts when samples from f are collected at a rotated set of sample points, projected, and then $\tilde{f}$ rotated back.

Orthonormality of the SH basis provides the useful property that given any two functions a and b over S, their projections satisfy $$\int \tilde{a}(s) \tilde{b}(s) ds = \sum_{i=1}^{n^2} a_i b_i. \qquad (5)$$

In other words, integration of the product of bandlimited functions reduces to a dot product of their projection coefficients.

Convolution. The convolution of a circularly symmetric kernel function h(z) with a function f is denoted as $h*f$. Note that h must be circularly symmetric (and hence can be defined as a simple function of z rather than s) in order for the result to be defined on S rather than the higher-dimensional rotation group SO, as per equation (3) above. Projection of the convolution satisfies $$(h*f)_l^m = \sqrt{\frac{4\pi}{2l+1}}\, h_l^0 f_l^m = \alpha_l^0 h_l^0 f_l^m. \qquad (6)$$

In other words, the coefficients of the projected convolution are simply scaled products of the separately projected functions. This property provides a fast way to convolve an environment map with a hemispherical cosine kernel, defined as $h(z) = \max(z,0)$, to get an irradiance map (as described in Ramamoorthi, R, and Hanrahan, P, An Efficient Representation for Irradiance Environment Maps, SIGGRAPH '01, 497-500). In this case, the projection coefficients of h can be obtained using an analytic formula. The convolution property can also be used to produce prefiltered environment maps with narrower kernels. Note that because h is circularly symmetric about z, its projection coefficients are nonzero only for m=0.

Product Projection. Projection of the product of a pair of spherical functions $c(s) = a(s) b(s)$ where a is known and b unknown can be viewed as a linear transformation of the projection coefficients $b_j$ via a matrix $\hat{a}$:

$$c_i = \int a(s)(b_j y_j(s)) y_i(s) ds \qquad (7)$$
$$= \left( \int a(s) y_i(s) y_j(s) ds \right) b_j = \hat{a}_{ij} b_j$$

where summation is implied over the duplicated j index. Note that $\hat{a}$ is a symmetric matrix.

Rotation. A reconstruction function rotated by Q, $\tilde{f}(Q(s))$, can be projected using a linear transformation of f's projection coefficients, $f_i$. Because of the rotation invariance property, this linear transformation treats the coefficients in each band independently. The most efficient implementation is achieved using a zyz Euler angle decomposition of the rotation Q, using a fairly complicated recurrence formula. (See, e.g., Chirikjian, G, and Stein, D, Kinematic Design and Commutation of a Spherical Stepper Motor, IEEE Transactions on Mechatronics, 4(4), Dec. 1999; Edmonds, A, Angular Momentum in Quantum Mechanics, Princeton University, Princeton, 1960; and Zare, R, Angular Momentum: Understanding Spatial Aspects in Chemistry and Physics, Wiley, N.Y., 1987.) When dealing only with low-order functions, the explicit rotation formulas described in these references can be implemented using symbolic integration.

2. Radiance Self-Transfer

Radiance self-transfer encapsulates how an object O shadows and scatters light onto itself. Radiance self-transfer is represented by first parameterizing incident lighting at points $p \in o$, denoted $L_p(s)$, using the SH basis. Incident lighting is therefore represented as a vector of $n^2$ coefficients $(L_p)_i$. In practice, this lighting can be sampled dynamically and sparsely near the surface, perhaps at only a single point. The assumption is that lighting variation over O not due to its own presence is small (see Section 4.1, Spatial Sampling of the Incident Radiance Field). Radiance self-transfer also can be precomputed and stored densely over O as transfer vectors or matrices.

A transfer vector $(M_p)_i$ can be used for diffuse surfaces and represents a linear transformation on the lighting vector producing scalar exit radiance, denoted $L'_p$, via the inner product $$L'_p = \sum_{i=1}^{n^2} (M_P)_i (L_P)_i \qquad (8)$$

In other words, each component of $(M_p)_i$ represents the linear influence that a lighting basis function $(L_p)_i$ has on shading at p.

A transfer matrix $(M_p)_{ij}$ can be used for glossy surfaces and represents a linear transformation on the lighting vector which produces projection coefficients for an entire spherical function of transferred radiance $L'_p(s)$ rather than a scalar; i.e, $$(L'_P)_i = \sum_{j=1}^{n^2} (M_p)_{ij} (L_p)_j. \qquad (9)$$

The difference between incident and transferred radiance is that $L'_p(s)$ includes shadowing and scattering effects due to the presence of O while $L_p(s)$ represents incident lighting assuming O was removed from the scene. Components of $(M_p)_{ij}$ represent the linear influence of the j-th lighting coefficient of incident radiance $(L_p)_j$ to the i-th coefficient of transferred radiance $L'_p(s)$. The next sections show how to derive transfer vectors for diffuse surfaces and transfer matrixes for glossy surfaces due to self-scattering on O.

2.1 Diffuse Transfer

First assume O is diffuse. The simplest transfer function at a point $p \in O$ represents unshadowed diffuse transfer, defined as the scalar function $$T_{DU}(L_p) = (\rho_p/\pi) \int L_p(s) H_{Np}(s) ds$$

producing exit radiance which is invariant with view angle for diffuse surfaces. Here, $\rho_p$ is the object's albedo at p, $L_p$ is the incident radiance at p assuming O was removed from the scene, $N_p$ is the object's normal at p, and $H_{Np}(s) = \max(N_p \cdot s, 0)$ is the cosine-weighted, hemispherical kernel about $N_p$. By SH-projecting $L_p$ and $H_{Np}$ separately, equation (5) reduces $T_{DU}$ to an inner product of their coefficient vectors. The resulting factors are referred to herein as the light function, $L_p$, and transfer function, $M_p$. In this first simple case, $$M_p^{DU}(s) = H_{Np}(s).$$

Because $N_p$ is known, the SH-projection of the transfer function $$(M_p^{DU})$$

can be precomputed, resulting in a transfer vector. In fact, storing is unnecessary because a simple analytic formula yields it given $N_p$. Because $$M_p^{DU}$$

is inherently a low-pass filter, second-order projection (9 coefficients) provides good accuracy in an arbitrary (even non-smooth) lighting environment.

To include shadows, we define shadowed diffuse transfer as $$T_{DS}(L_p) = (\rho_p/\pi) \int L_p(s) H_{Np}(s) V_p(s) ds$$

where the additional visibility function, $V_p(s) \to \{0,1\}$, equals 1 when a ray from p in the direction s fails to intersect O again (i.e., is unshadowed). As with unshadowed transfer, this integral can be decomposed into two functions, using an SH-projection of $L_p$ and the transfer function $$M_p^{DS}(s) = H_{Np}(s) V_p(s). \qquad (10)$$

Separately SH-projecting $L_p$ and $M_p$ again reduces the integral in $T_{DS}$ to an inner product of coefficient vectors.

Transfer is now nontrivial; Radiance self-transfer can be precomputed using a transport simulator (as described in "Precomputing Self-Transfer" Section below), storing the resulting transfer vector $(M_p)_i$ at many points p over 0. Unlike the previous case, second-order projection of $$M_p^{DS}$$

may be inaccurate even for smooth lighting environments since $V_p$ can create higher-frequency lighting locally, e.g., by self-shadowing "pinholes". Using 4-th or 5-th order projection provides good results on typical meshes in smooth lighting environments. Compare, for example, the unshadowed and shadowed images of the diffuse surface object in FIG. 9.

Finally, to capture diffuse interreflections (see, for example, the interreflected image in FIG. 9) as well as shadows, the interreflected diffuse transfer can be defined as $$T_{DI}(L_p) = T_{DS}(L_p) + (\rho_p/\pi) \int \tilde{L}_p(s) H_{Np}(s) (1 - V_p(s)) ds$$

where $\tilde{L}_p(s)$ is the radiance from O itself in the direction s. The difficulty is that unless the incident radiance emanates from an infinitely-distant source, the radiance $\tilde{L}_p(s)$ is not known given the incident radiance only at p because $\tilde{L}_p$ depends on the exit radiance of points arbitrarily far from p and local lighting varies over O. If lighting variation is small over O then $\tilde{L}_p$ is well-approximated as if O were everywhere illuminated by $L_p$. $T_{DI}$ thus depends linearly on $L_p$ and can be factored as in the previous two cases into a product of two projected functions: one light-dependent and the other geometry-dependent.

Though precomputed interreflections must make the assumption of spatially invariant incident lighting over O, simpler shadowed transfer need not. The difference is that shadowed transfer depends only on incident lighting at p, while interreflected transfer depends on many points $q \neq p$ over O at which $L_q \neq L_p$. Thus, as long as the incident radiance field is sampled finely enough (as discussed in "Spatial Sampling of the Incient Radiance Field" Section below), local lighting variation can be captured and shadowed transfer will be correct.

The presence of $\tilde{L}$ makes it hard to explicitly denote the transfer function for interreflections, $$M_p^{DI}(s).$$

The "Precomputing Self-Transfer" Section below discusses how to compute its projection coefficients numerically.

2.2 Glossy Transfer

Self-transfer for glossy objects can be defined similarly, but generalizes the kernel function to depend on a (view-dependent) reflection direction R rather than a (fixed) normal N. Analogous to the H kernel from before, radiance self-transfer can model glossy reflection as the kernel G(s, R,r) where a scalar r defines the "glossiness" or broadness of the specular response.

The analogous three glossy transfer functions for the unshadowed, shadowed, and interreflected cases can be defined as $$T_{GU}(L_p,R,r) = \int L_p(s)G(s,R,r)ds$$

$$T_{GS}(L_p,R,r) = \int L_p(s)G(s,R,r)V_p(s)ds$$

$$T_{GI}(L_p,R,r) = T_{GS}(L_p) + \int \tilde{L}_p(s)G(s,R,r)(1-V_p(s))ds$$

which output scalar radiance in direction R as a function of $L_p$ and R, quantities both unknown at precomputation time. Since transfer is no longer solely a function of s, it can't be reduced to a simple vector of SH coefficients Instead of parameterizing scalar transfer by R and r, a more useful decomposition is to transfer the incident radiance $L_p(s)$ into a whole sphere of transferred radiance, denoted $L'_p(s)$. Assuming the glossy kernel G is circularly symmetric about R, $L'_p(s)$ can then be convolved with $G^*_r(z) = G(s,(0,0,1),r)$ and evaluated at R to produce the final result.

Transfer to $L'_p$ is now represented as a matrix rather than a vector. For example, glossy shadowed transfer can be defined as $$M_p^{GS}(L_p, s) = L_p(s)V_p(s). \quad (11)$$

a linear operator on $L_p$ whose SH-projection can be represented as the symmetric matrix $\hat{V}_p$ via equation (7). Even with very smooth lighting, more SH bands are used for $L'_p$ as the glossiness of O increases; non-square matrices (e.g., 25×9) mapping low-frequency lighting to higher-frequency transferred radiance are useful under these conditions.

An important limitation of precomputed radiance self-transfer is that material properties of O influencing interreflections in $T_{DI}$ and $T_{GI}$ (like albedo or glossiness) are "baked in" to the preprocessed transfer and can't be changed at run-time. On the other hand, the simpler shadowed transfers without interreflection do allow run-time change and/or spatial variation over O of the material properties. Error arises if blockers or light sources intrude into O's convex hull. O can only move rigidly, not deform or move one component relative to the whole. Recall also the assumption of low lighting variation over O required for correct interreflections.

Finally, note that diffuse transfer as defined above produces radiance after leaving the surface, since it has already been convolved with the cosine-weighted normal hemisphere, while glossy transfer produces radiance incident on the surface and is convolved with the local BRDF to produce the final exit radiance. It's also possible to bake in a fixed BRDF for glossy O, making the convolution with G unnecessary at run-time but limiting flexibility.

FIG. 9 illustrates unshadowed, shadowed and interreflected images of a glossy surface object.

3. Precomputing Self-Transfer

Figure 2:
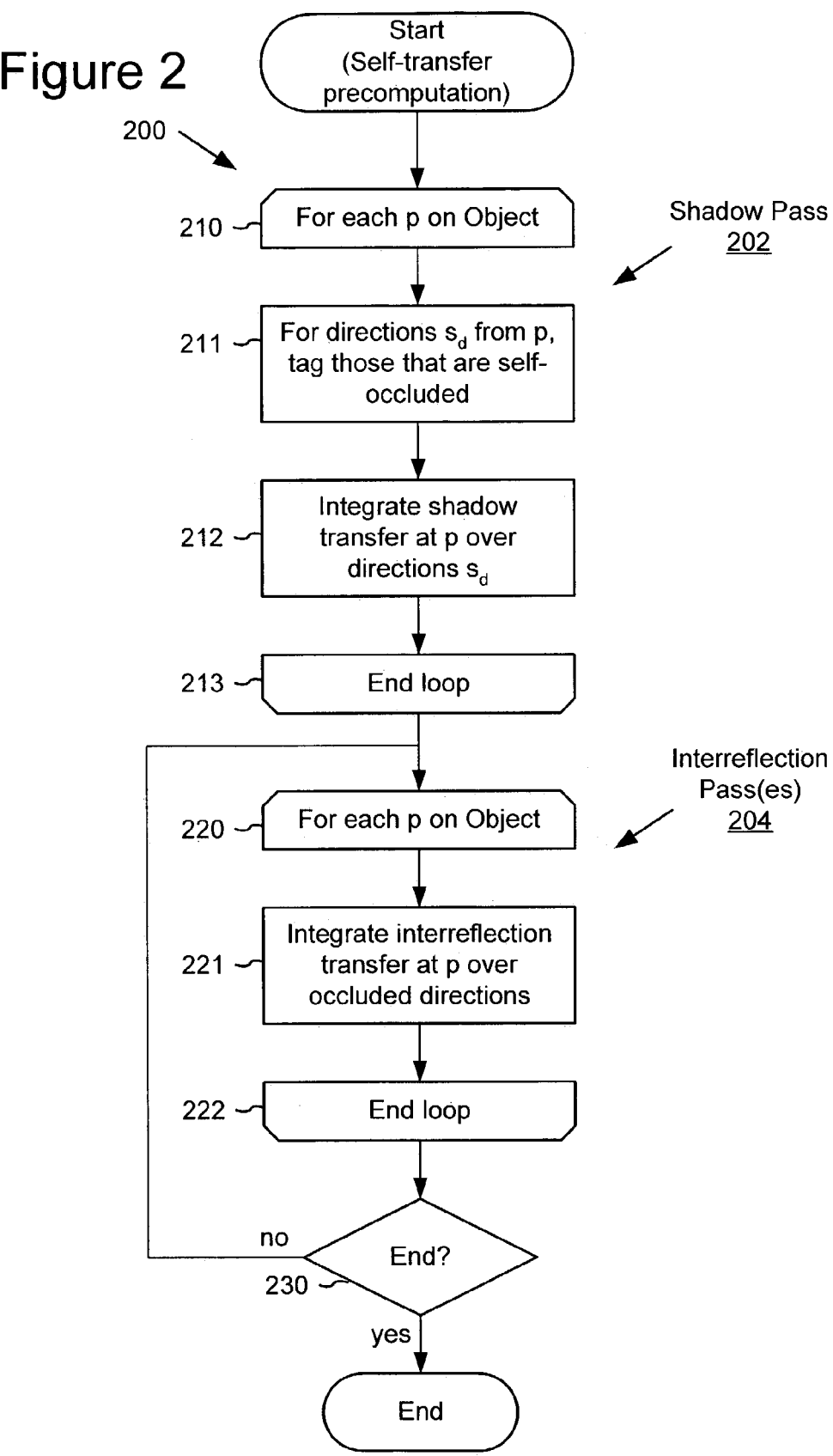
FIG. 2 is a flow diagram of a self-transfer precomputation in the image rendering system of FIG. 1.

With reference now to FIG. 2, the illumination simulator 120 (FIG. 1) precomputes the radiance self-transfer of the modeled object in a global illumination simulation 200 (also referred to as "self-transfer precomputation") performed over an object O using the SH basis over the infinite sphere as emitters (the "reference lighting environment" for the simulation). The simulation is parameterized by an n-th order SH projection of the unknown sphere of incident light L; i.e., by $n^2$ unknown coefficients $L_i$. Though the simulation results can be computed independently for each $L_i$ using the SH basis function $y_i(s)$ as an emitter, it is more efficient to compute them all at once. The reference lighting environment (infinitely-distant sphere L) will be replaced at run-time by the actual incident radiance around O, $L_p$.

The simulation 200 begins with a pass ("shadow pass" 202) that simulates direct shadows from paths leaving L and directly reaching sample points $p \in o$. In subsequent passes ("interreflections passes" 204), interreflections are added, representing paths from L that bounce a number of times off O before arriving at p (Lp, LDp, LDDp, etc.). In each pass, energy is gathered to every sample point on the p surface. Large emitters (i.e., low-frequency SH basis) make a gather more efficient then a shooting-style update.

To capture the sphere of directions at sample points $p \in o$, the simulation generate a large (10 k-30 k), quasi-random set of directions $\{S_d\}$, $S_d \in s$. The simulation also precomputes evaluations for all the SH basis functions at each direction $S_d$. The directions $S_d$ are organized in hierarchical bins formed by refining an initial icosahedron with 1→2 bisection into equal-area spherical triangles (1→4 subdivision does not lead to equal area triangles on the sphere as it does in the plane). The simulation uses 6 to 8 subdivision levels, creating 512 to 2048 bins. Every bin at each level of the hierarchy contains a list of the $S_d$ within it.

In the first or shadow pass 202, for each $p \in o$, the simulation 200 tags (at 211) those directions from the point p that are self-occluded by the object. The simulation casts shadow rays in the hemisphere about p's normal $N_p$, using the hierarchy to cull directions outside the hemisphere. The simulation tags each direction $S_d$ with an occlusion bit, $1-V_p(S_d)$, indicating whether $S_d$ is in the hemisphere and intersects O again (i.e., is self-shadowed by O). An occlusion bit is also associated with the hierarchical bins, indicating whether any sd within it is occluded. Self-occluded directions and bins are tagged so that we can perform further interreflection passes on them; completely unoccluded bins/samples receive only direct light from the environment.

Next, at 212, the simulation 200 integrates the transfer radiance for the points p. For diffuse surfaces, at each point $p \in o$, the simulation further computes the transfer vector by SH-projecting $M_p$ from equation (10). For glossy surfaces, the simulation computes the transfer matrix by SH-projecting $M_p$ from equation (11). In either case, the result represents the radiance collected at p, parameterized by L. SH-projection to compute the transfers is performed by numerical integration over the direction samples $S_d$, summing into an accumulated transfer using the following rules:

diffuse: $(M_p)_i^o \mathrel{+}= (\rho_p/\pi) V_p(s_d) H_N(s_d) y_i(s_d)$ glossy: $(\mathcal{M}_p)_{ij}^o \mathrel{+}= V_p(s_d) y_j(s_d) y_i(s_d)$ Transfer integration over $s_d$ [shadow pass, iteration 0]

The superscript O refers to the iteration number. The vector $M_p$ or matrix $M_p$ at each point p is initialized to O before the shadow pass, which then sums over all $S_d$ at every p. The rules are derived using equation (1) for diffuse transfer integration, and equation (7) for glossy transfer integration.

Figure 7:
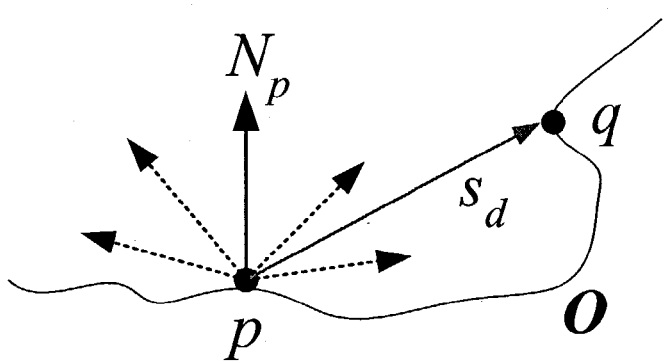
FIG. 7 is a drawing depicting simulated interreflection in the self-transfer precomputation of FIG. 2.
Figure 10:
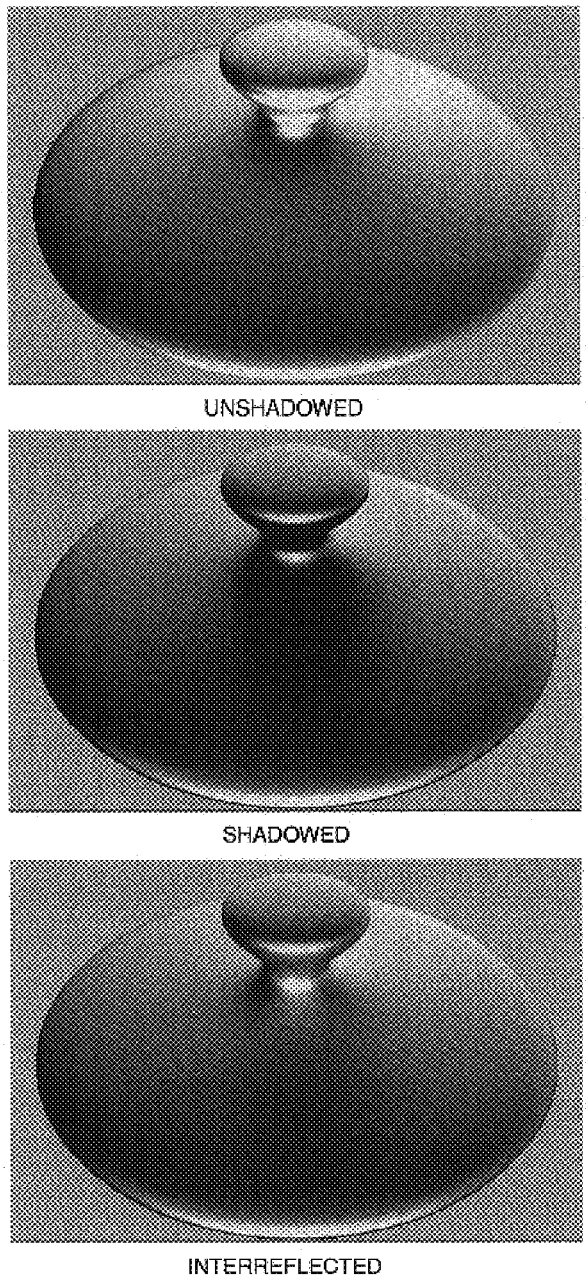
FIG. 10 depicts images produced both unshadowed and via the real-time rendering of FIG. 3, which illustrate effects of glossy surface self-transfer.

With reference also to FIG. 7, later interreflection passes 204 traverse the bins having the occlusion bit set during the shadow pass to now integrate the interreflection transfer at 221. Instead of shadow rays, the simulation shoots rays that return transfer from exiting illumination on O. If the ray $(p,S_d)$ intersects another point $q \in O$ (where q is closest to p), we sample the radiance exiting from q in the direction $-S_d$. The following update rules are used, where the superscript b is the bounce pass iteration:

diffuse: $(M_p)_i^o \mathrel{+}= (\rho_p/\pi)(1 - V_p(s_d))(M_q)_i^{b-1} H_N(s_d)$ glossy: $(\mathcal{M}_p)_{ij}^o \mathrel{+}= (1 - V_p(s_d))$ $\left( \sum_k \alpha_k (G_{r_q}^*)_k (\mathcal{M}_q)_{kj}^{b-1} y_k(\text{reflect}(-s_d, N_q)) \right) y_i(s_d)$ Transfer integration over $s_d$ [interreflection passes, iteration b]

As in the shadow pass 202, the interreflections pass(es) 204 begin by initializing transfer vectors or matrices to 0 before accumulating transfer over directions $S_d$. The diffuse rules are derived from the definition of $T_{DI}$ and equation (1); glossy rules from the definition of $T_{GI}$ and equations (6) and (7). The middle factor in the glossy transfer definition represents radiance emanating from q back to p from the previous bounce pass, b−1. Since $M_q$ stores incident radiance, it must be convolved with O's BRDF at q to obtain exiting radiance in the $-S_d$ direction, yielding a summation over k. Recall that $\alpha_k$ is the k-th convolution coefficient, expressed in singly-indexed notation. The "reflect" operator simply reflects its first vector argument with respect to its second. Observe that equation (7) implies $(M_p)_{ij}$ is a symmetric matrix for shadowed glossy transfer since it is formed by the product of two spherical functions; this is untrue for interreflected glossy transfer.

As shown at 230, interreflection passes 204 are repeated until an end criteria is met, such as the total energy of a given pass falls below a threshold of significance. For typical materials, interreflection diminishes quite rapidly. The sum of transfers from all bounce passes then accounts for interreflections.

Alternatively, a simple enhancement to this simulation allows mirror-like surfaces within O. The simulation does not record transfers on such surfaces. Instead, a ray striking a mirrored surface is always reflected and then propagated until a non-mirrored surface is reached. Thus, the paths at successive iterations can be represented as (L[S]*p, L[S]*D[S]*p, L[S]*D[S]*D[S]*p, etc.), where D is a diffuse or glossy bounce and S is a specular one. This captures caustics onto diffuse or glossy receivers that respond dynamically to lighting change.

4. Run-time Rendering of Radiance Transfer

Figure 3:
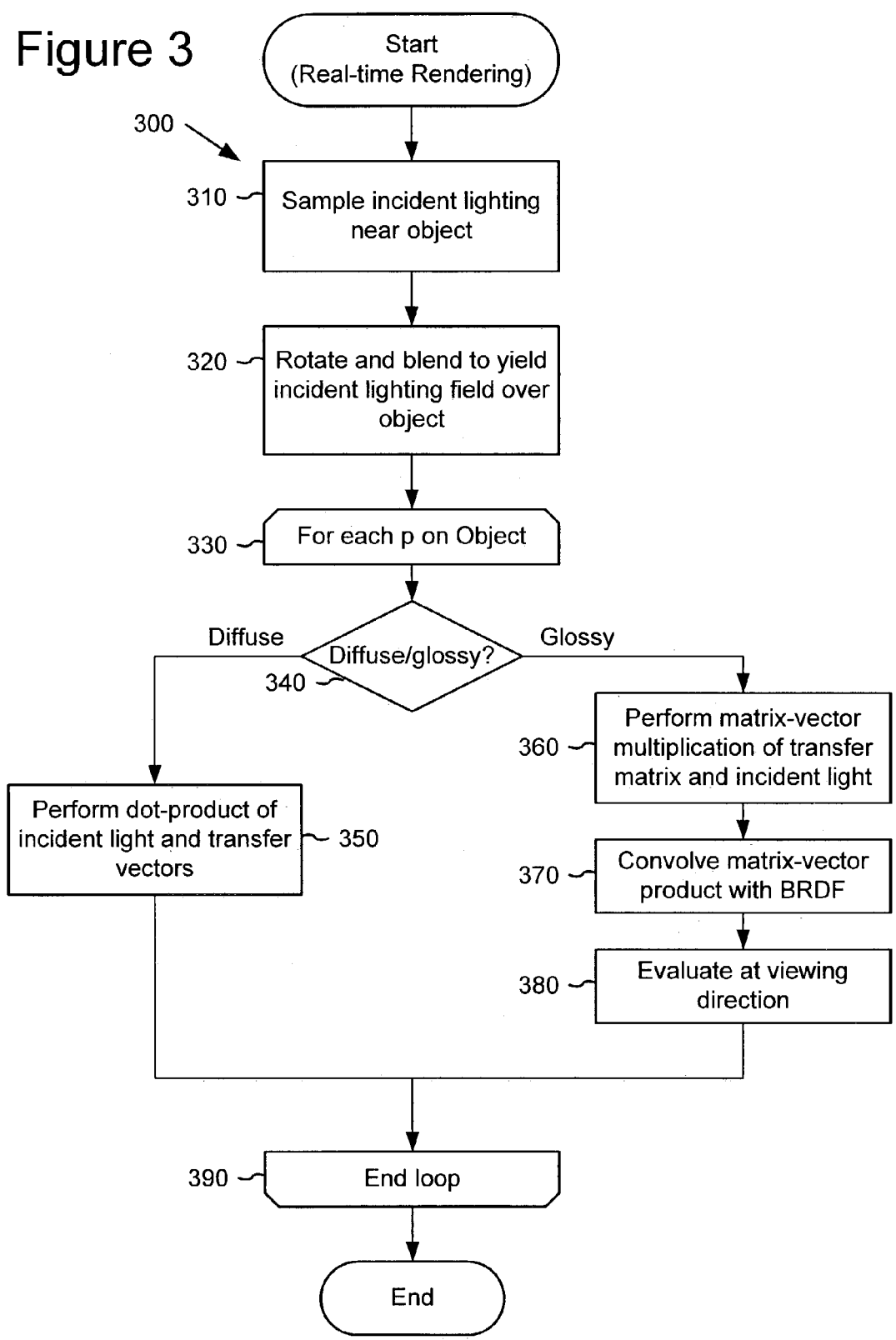
FIG. 3 is a flow diagram of a real-time rendering of radiance transfer in the image rendering system of FIG. 1.
Figure 4:
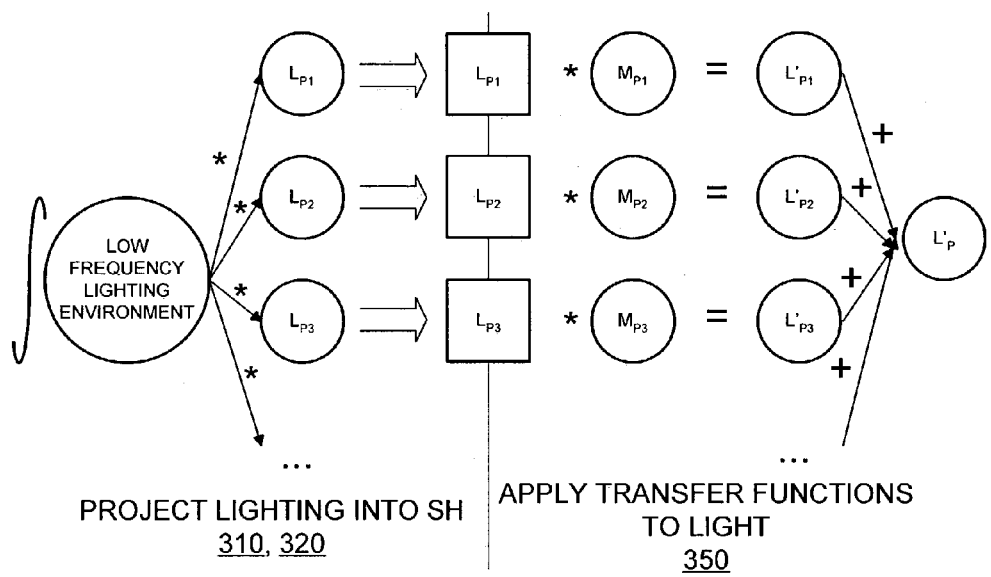
FIG. 4 is a flow diagram of processing run-time diffuse surface self-transfer in the real-time rendering of FIG. 3.
Figure 5:
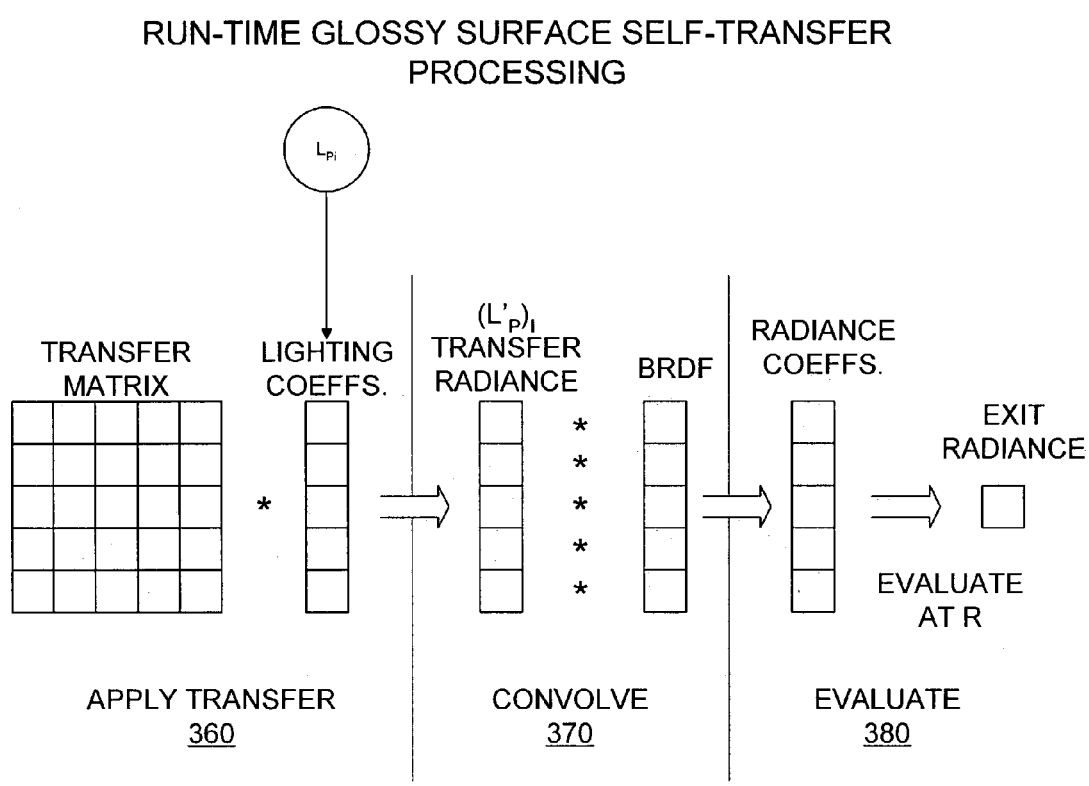
FIG. 5 is a flow diagram of processing run-time glossy surface self-transfer in the real-time rendering of FIG. 3.

The simulation 200, (FIG. 2) just described provides a model capturing radiance transfer at many points p over the object's surface, represented as vectors or matrices. With reference now to FIG. 3, the real-time rendering engine 140 (FIG. 1) then uses this model in a run-time procedure 300 to compute the object's self-transfer radiance during real-time image rendering of the object in a chosen lighting environment and viewing direction. FIGS. 4 and 5 separately illustrate the processing flow according to run-time procedure 300 for diffuse and glossy surfaces, respectively.

In the procedure 300, the rendering engine 140 performs the following actions at run-time: at 310, compute incident lighting $\{L_{Pi}\}$ at one or more sample points $P_i$ near O in terms of the SH basis; at 320, rotate these $L_{Pi}$ to O's coordinate frame and blend them (see below) to produce a field of incident lighting $L_p$ over 0; and at 330-390, perform a linear transformation on $(L_p)_i$ at each point p on O to obtain exit radiance. This linear transformation is a dot product with $(M_p)_i$ for diffuse surfaces (equation (8)) at action 350, or a matrix-vector multiplication with $(M_p)_{ij}$ for glossy surfaces (equation (9)) at action 360. Glossy surfaces have further actions 370 and 380 in which the radiance vector resulting from the multiplication 360 is convolved with O's BRDF at p, and then evaluated at the view-dependent reflection direction R.

For action 310, the rendering engine 140 can load a precomputed environment map, evaluate analytic lighting models in software, or sample radiance using graphics hardware, as representations for the incident lighting of the chosen lighting environment. The rotation for action 320 is outlined in Section 1, Review of Spherical Harmonics, and is done once per object, not for each p. The rotation is performed because transfer is stored using a common coordinate system for O. If O is rigidly moving, it is more efficient to rotate the few radiance samples in $L_{pi}$ to align with O than it is to rotate O's many transfer functions.

For diffuse surfaces, a simple implementation of action 350 is to store the transfer vector per vertex and perform the dot product in a vertex shader. The transfer vectors can also be stored in texture maps rather than per-vertex and evaluated using a pixel shader. Since the coefficients are signed quantities not always in the [−1,1] range, DirectX® application programming interface. v. 8.1 pixel shaders (V1.4) or their OpenGL® graphics interface counterpart (extension by ATI) can be used, since they provide a larger range of [−8,8].

In one implementation, the pixel shader needs only 8 instructions to perform the dot-product and stores $L_p$'s projection coefficients in constant registers.

For colored environments or simulation of color bleeding on O, three passes are performed, each performing a separate dot-product for the r, g, and b channels. Otherwise, a single pass suffices.

For glossy self-transfer, the matrix transform from equation (9) can be performed in software because the transfer matrix can be too large to be manipulated in either current vertex or pixel shaders. The result is $(L'_p)_i$ the SH coefficients of transferred radiance at points p over $\mathbf{0}$. Then in a pixel shader, the convolution 370 can be performed with a simple cosine-power (Phong lobe) kernel for $G^*$ and evaluate the result in the reflection direction R. The result can be written $$\sum_{i=1}^{n^2} \alpha_i G_i^* \left( \sum_{j=1}^{n^2} (M_p)_{ij} (L_p)_j \right) y_i(R) \qquad (12)$$

SH-projections up to 5-th order can be evaluated on current graphics hardware.

4.1 Spatial Sampling of the Incident Radiance Field

A simple and useful approach for dynamically sampling incident radiance is to sample the incident radiance at O's center point. To handle local lighting variation over O, a more accurate technique samples incident lighting at multiple points. A good set of sample points can be obtained using the ICP (iterated closest point) algorithm (see, Linde, Y, Buzo, A, and Gray, R, An algorithm for Vector Quantizer Design, IEEE Transaction on Communication COM-28, 1980, 84-95) as a preprocess, given a desired number of points as input. This produces a representative set of points $P_i$ near O and distributed uniformly over O where incident lighting can be sampled at run-time. The rendering engine 140 also can precompute coefficients at each p over O that blend contribution from each of the resulting sampled radiance spheres $L_{Pi}$ to produce an incident radiance field over O, denoted previously by $L_p$.

FIG. 11 depicts images resulting from sampling incident radiance at a single point, ICP points, and multiple samples, and rendering using the run-time procedure 300 of FIG. 3.

4.2 Sampling SH Radiance on Graphics Hardware

Graphics hardware is useful to capture the radiance samples $\{L_{Pi}\}$ in a dynamic scene. To do this, 6 images are rendered from each $P_i$ corresponding to the 6 faces of the cube map spherical parameterization. O itself should be removed from these renderings. Cube map images are then projected to their SH coefficients using the integral in equation (1).

For efficiency, textures are precomputed for the basis functions weighted by differential solid angle, $B_l^m(s) = y_l^m(s) ds(s)$, each evaluated over the cube map parameterization for s. The resulting integral then becomes a simple dot product of the captured samples of $L_P(S)$ with the textures $B_l^m(s)$.

Ideally, this computation would be performed on the graphics hardware. Alternatively, due to precision issues and inability to do inner products in hardware, the sampled radiance images may be read back and then projected in software. In this case, it is helpful to reduce the resolution of read-back images as much as possible.

Low-order SH projection can be computed with very low-resolution cube maps, assuming they have been properly bandlimited. For example, spherical signals already bandlimited to 6-th order can be projected using 6×4×4 images with about 0.3% average-case squared error and about 1% worst-case squared error, where error is normalized by assuming unit-power signals (i.e., signals whose integrated square over the sphere is 1). (More precisely, average-case error is the integrated squared difference between the reference and reconstruction signals, averaged over all unit-power signals. Worst-case error is the same integrated error, but for the worst-case unit-power signal.) For 6×8×8 maps, this error reduces to 0.003% mean and 0.02% worst-case. Unfortunately, typical signals aren't spherically bandlimited. Another analysis shows that, assuming continuous bilinear reconstruction over the sampled 2D images, projection to 6-th order using 6×8×8 images yields 0.7% and 2% average and worst-case squared error, while 6×16×16 yields 0.2% and 0.5% error.

In an illustrative implementation, 6×16×16 images are extracted from the hardware. As is always true in point-sampled rendering, aliasing of the 2D images is still a problem because the above analysis uses bilinear reconstruction from point samples as the reference. To reduce aliasing, the cube map images can be supersampled (e.g., by a factor of 2) in each dimension, and a box-filtered decimation performed in hardware before reading back and projecting. The basis function textures are also supersampled and decimated in the same way as a preprocess. For a radiance sample, including read-back and SH projection, this illustrative implementation takes about 1.1 6 ms on a PIII-933 PC with ATI Radeon® 8500 graphics processing unit.

4.3 Self-Transfer for Volumetric Models

Figure 12:
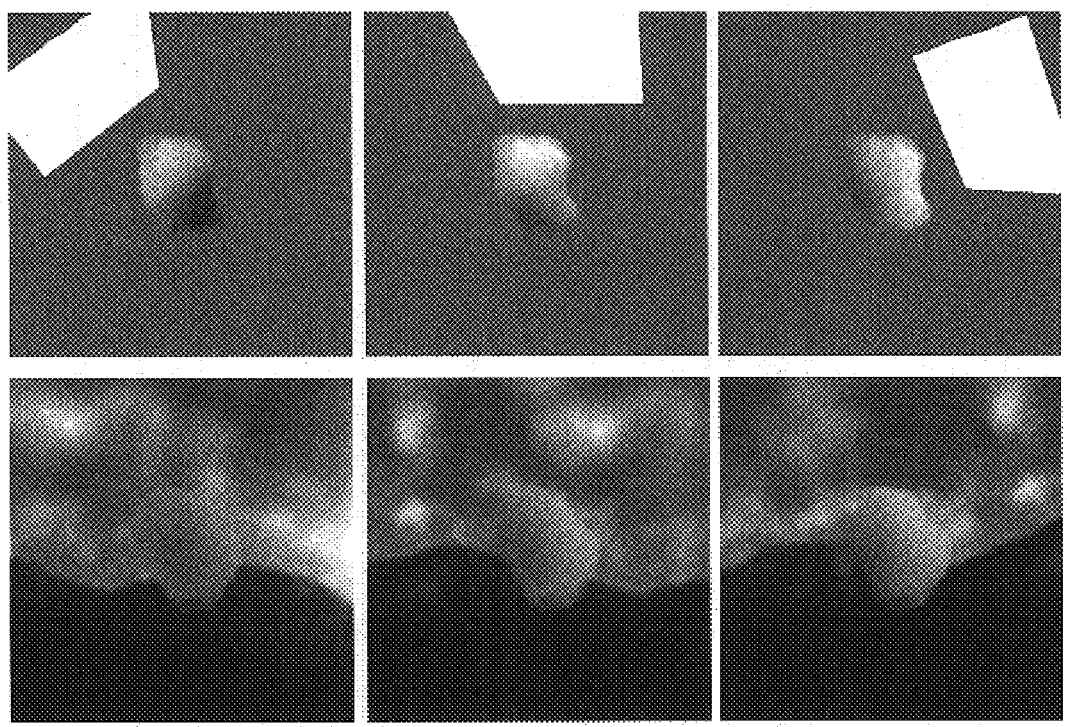
FIG. 12 depicts images of volumetric self-transfer produced via the real-time rendering of FIG. 3.

Self-transfer on volumetric data uses the same framework as surfaces. The resulting precomputed model allows run-time changes to the lighting, with correct shadowing and interreflections in any low-frequency lighting environment. FIG. 12 illustrates images of a cloud model for which volumetric self-transfer was used in a volumetric self-transfer variation (described hereafter) of run-time procedure 300 to capture how the cloud model shadows and scatters light to itself.

As with surface transfer, a preprocessing step simulates lighting on the volume using the SH basis functions as emitters. For shadowed transfer without interreflection (i.e., direct shadowing), the simulator gathers energy from the emitter to every voxel p of the volume, attenuated by its path through the volume. The required numerical integration over directions $S_d$ can be expressed as $$(M_p)_i^0 += A(p \rightarrow p + Ds_d) y_i(s_d)$$

where $A(p \rightarrow q)$ is the volume's integrated attenuation along the path from p to q, and D is the distance until the ray $(P, S_d)$ exits the volume. To include interreflections, the simulation traverses every voxel p and forward-scatter its transfer along random directions $S_d$. The transfer is deposited to all voxels q along $s_d$ until exiting the volume, using the rule $$(M_q)_i^b += A(p \rightarrow q)(M_p)_i^{b-1}$$

More passes over the volume produce further indirect bounces.

Rendering is performed in the traditional way: by drawing slices through the 3D volume in back to front order using alpha blending to account for transparency. Each slice is a 2D image containing samples of the transfer vector. A pixel shader computes the dot-product between the lighting's coefficients and the transfer vector's required to shade each slice.

5. Radiance Neighborhood-Transfer

Figure 13:
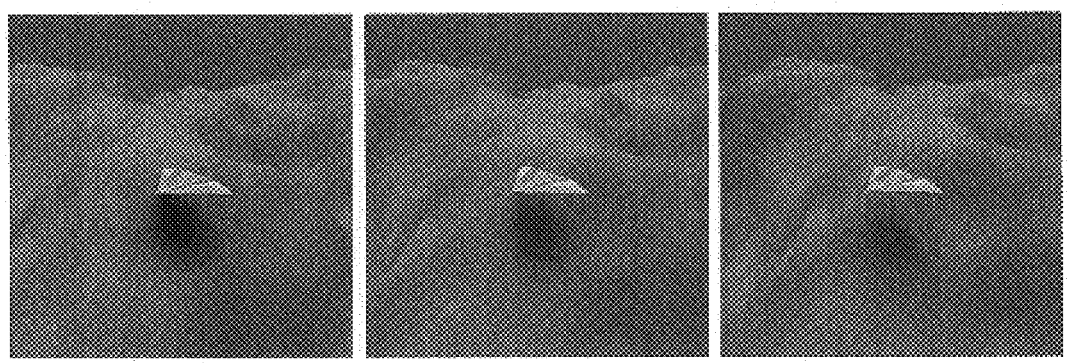
FIG. 13 depicts images of neighborhood transfer produced via the real-time rendering of FIG. 3.

Neighborhood-transfer precomputes an object O's influence on its neighboring environment with respect to parameterized, low-frequency lighting. FIG. 13 illustrates images of a hang glider casting soft shadows onto a neighboring bumpy terrain captured with a neighborhood transfer variation (described hereafter) of the simulation 200 (FIG. 2) and run-time rendering procedure 300 (FIG. 3). Transport simulation is identical to that for self-transfer in Section 3, Precomputing Self-Transfer, but takes place with respect to points in a 3D space surrounding O, not on it. At run-time, an arbitrary receiver R can be placed in this volume to capture shadows, reflections, and caustics cast by O onto R without knowing R in advance. For example, a moving vehicle O can cast shadows over a terrain R. Cast shadows and lighting also respond to lighting change; for example, moving the lights move soft shadows on R. This generalizes irradiance volumes (see, e.g., Greger, G., Shirley, P, Hubbard, P, and Greenberg, D, The Irradiance Volume, IEEE Computer Graphics and Applications, 6(11):21-29, 1986) by accounting for glossy transfer and allowing dynamic lighting.

Because R is unknown during the precomputation step, O's neighborhood volume stores a transfer matrix rather than a vector. This is true even for diffuse receivers, because it is not known in advance what R's normal will be.

In one implementation, the simulator precomputes the transfer matrix $M_p$ at each point within a simple 3D grid surrounding O. At run-time, the rendering engine performs the matrix transform from equation (9) in software at each point in the volume and uploads the result to the graphics hardware. The result is a volume texture containing coefficients of transferred radiance ($L'_p$), which is applied to R.

Then, in a pixel shader, this transferred radiance is used to light the receiver. A diffuse receiver convolves the radiance with the cosine weighted hemisphere H* using equation (6) and then evaluates the resulting SH projection at R's normal vector. Glossy receivers perform equation (12).

Receivers having precomputed self-transfer raise the difficulty that O and R do not share a common coordinate system. Thus, one of the two object's dense set of transfer samples must be dynamically rotated to align with the other's. Although its complexity is $O(n^4)$, identical to the complexity of performing the matrix transform in equation (9), rotation of higher-order projections is substantially more expensive than that operation. Improving hardware should soon ease this difficulty.

Compared to self-transfer, neighborhood-transfer incurs some additional approximation errors. Cast shadow or light from multiple neighborhood-transfer objects onto the same receiver is hard to combine. Local lighting variation not due to O or R's presence is also a problem; lighting must be fairly constant across O's entire neighborhood to provide accurate results. In particular, errors such as missing shadows will result when objects besides O and R intrude into O's neighborhood. O's neighborhood must also be large enough to encompass any cast shadow or light it may cast on R. Nevertheless, neighborhood transfer captures effects impossible to obtain in real-time with previous methods.

6. Computing Environment

Figure 6:
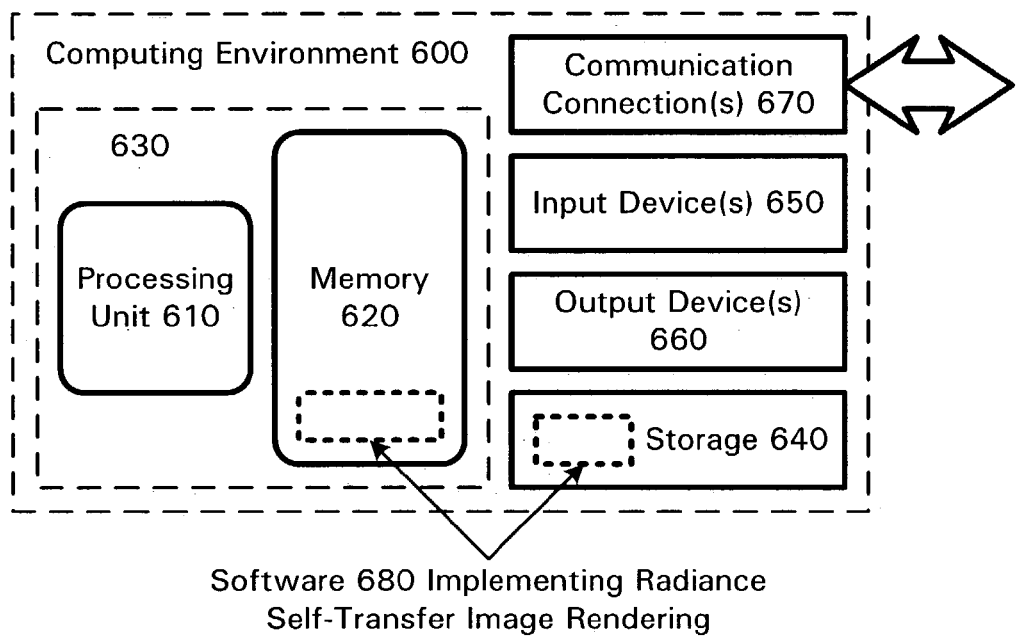
FIG. 6 is a block diagram of a suitable computing environment for the image rendering system of FIG. 1.

FIG. 6 illustrates a generalized example of a suitable computing environment (600) in which the illustrative embodiment may be implemented. The computing environment (600) is not intended to suggest any limitation as to scope of use or functionality of the invention, as the present invention may be implemented in diverse general-purpose or special-purpose computing environments.

With reference to FIG. 6, the computing environment (600) includes at least one processing unit (610) and memory (620). In FIG. 6, this most basic configuration (630) is included within a dashed line. The processing unit (610) executes computer-executable instructions and may be a real or a virtual processor. In a multi-processing system, multiple processing units execute computer-executable instructions to increase processing power. The memory (620) may be volatile memory (e.g., registers, cache, RAM), non-volatile memory (e.g., ROM, EEPROM, flash memory, etc.), or some combination of the two. The memory (620) stores software (680) implementing graphics image rendering with radiance self-transfer.

A computing environment may have additional features. For example, the computing environment (600) includes storage (640), one or more input devices (650), one or more output devices (660), and one or more communication connections (670). An interconnection mechanism (not shown) such as a bus, controller, or network interconnects the components of the computing environment (600). Typically, operating system software (not shown) provides an operating environment for other software executing in the computing environment (600), and coordinates activities of the components of the computing environment (600). As already mentioned, the computing environment desirably includes graphics processing hardware and software, such as the DirectX® application programming interface and OpenGL® graphics interface function libraries, and ATI Radeon® or NVidia GeForce® graphics processing unit-based video cards.

The storage (640) may be removable or non-removable, and includes magnetic disks, magnetic tapes or cassettes, CD-ROMs, CD-RWs, DVDs, or any other medium which can be used to store information and which can be accessed within the computing environment (600). The storage (640) stores instructions for the software (680) implementing the image rendering system (FIG. 1).

The input device(s) (650) may be a touch input device such as a keyboard, mouse, pen, or trackball, a voice input device, a scanning device, or another device that provides input to the computing environment (600). For audio, the input device(s) (650) may be a sound card or similar device that accepts audio input in analog or digital form. The output device(s) (660) may be a display, printer, speaker, or another device that provides output from the computing environment (600).

The communication connection(s) (670) enable communication over a communication medium to another computing entity. The communication medium conveys information such as computer-executable instructions, compressed audio or video information, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

The invention can be described in the general context of computer-executable instructions, such as those included in program modules, being executed in a computing environment on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing environment.

For the sake of presentation, the detailed description uses terms like "determine," "get," "adjust," and "apply" to describe computer operations in a computing environment. These terms are high-level abstractions for operations performed by a computer, and should not be confused with acts performed by a human being. The actual computer operations corresponding to these terms vary depending on implementation.

Having described and illustrated the principles of our invention with reference to an illustrative embodiment, it will be recognized that the illustrative embodiment can be modified in arrangement and detail without departing from such principles. It should be understood that the programs, processes, or methods described herein are not related or limited to any particular type of computing environment, unless indicated otherwise. Various types of general purpose or specialized computing environments may be used with or perform operations in accordance with the teachings described herein. Elements of the illustrative embodiment shown in software may be implemented in hardware and vice versa.

In view of the many possible embodiments to which the principles of our invention may be applied, we claim as our invention all such embodiments as may come within the scope and spirit of the following claims and equivalents thereto.

We claim:

1. A method performed by a computer for real-time rendering of computer graphics images of a glossy surface on a geometrically modeled object, the method comprising:
   projecting radiance under a lighting environment to a spherical harmonic basis to produce a lighting coefficient vector for at least one location of the modeled object;
   determining exiting radiance for a viewing direction from at least one location on the glossy surface as a function of the lighting coefficient vector, a pre-computed radiance transfer matrix data representing radiance response including global transport effects of the glossy surface at the at least one location to source light under a reference low-frequency lighting environment, and a bi-directional reflectance distribution function for the at least one location;
   calculating shading of the glossy surface of the modeled object at the at least one location; and
   presenting an image of the glossy surface of the modeled object with the shading on an image output device for viewing by a user;
   wherein determining exiting radiance for a viewing direction comprises:
      performing a matrix-vector multiplication of the lighting coefficient vector with a pre-computed radiance transfer matrix for at least one location on the glossy surface, the pre-computed radiance transfer matrix representing radiance response including global transport effects of the glossy surface at the at least one location to source light under the reference low-frequency lighting environment;
   convolving a resulting product of the matrix-vector multiplication with a bi-directional reflectance distribution function for the location on the glossy surface of the modeled object; and
   evaluating a result of the convolving for a viewing direction.

2. A method performed by a computer for real-time rendering of computer graphics images of a glossy surface on a geometrically modeled object, the method comprising:
   projecting radiance under a lighting environment to a spherical harmonic basis to produce a lighting coefficient vector for at least one location of the modeled object;
   determining exiting radiance for a viewing direction from at least one location on the glossy surface as a function of the lighting coefficient vector, a pre-computed radiance transfer matrix data representing radiance response including global transport effects of the glossy surface at the at least one location to source light under a reference low-frequency lighting environment, and a bi-directional reflectance distribution function for the at least one location;
   calculating shading of the glossy surface of the modeled object at the at least one location; and presenting a viewable image of the glossy surface of the modeled object with the shading on an output device;
   wherein determining exiting radiance for a viewing direction comprises:
      computing the exiting radiance based on a matrix-vector multiplication of the lighting coefficient vector with a pre-computed radiance transfer matrix for at least one location on the glossy surface, the pre-computed radiance transfer matrix representing radiance response including global transport effects of the glossy surface at the at least one location to source light under the reference low-frequency lighting environment.

3. A method performed by a computer of producing radiance self transfer data representing radiance response including global transport effects for use in real-time rendering and display of computer graphics images of a modeled object, the method comprising:
   performing a global illumination simulation over the modeled object for a reference lighting environment represented as a linear combination of area-supported basis functions, the simulation calculating radiance transfer for a plurality of sample points on the modeled object, the simulation incorporating self shadowing and inter-reflections of the modeled object;
   recording the global illumination simulation for the plurality of sample points as a linear transformation of the area-supported basis functions'coefficients for use in rendering radiance transfer over the modeled object to produce graphical images of the modeled object;
   performing the global illumination simulation in multiple passes over the modeled object;
   in a first shadowing pass, simulating direct illumination of a plurality of sample points on the modeled object including self-shadowing of the modeled object, the direct illumination simulating comprising, for a sample point,
      evaluating a plurality of directions from the sample point within a hemisphere about a normal direction to a surface of the modeled object at the sample point;

tagging those directions from the sample point that intersect the modeled object as being occluded;
accumulating radiance transfer from direct illumination of the sample point in the directions to produce radiance transfer data for the sample point; and
in subsequent interreflection passes, simulating interreflection illumination of the sample points on the modeled object, the interreflection illumination simulating comprising, for a sample point,
accumulating radiance transfer from interreflected illumination of the sample point in the directions tagged as occluded to produce radiance transfer data for the sample point;
repeating interreflection passes until a criteria is met; and
summing for a sample point the radiance transfer data accumulated in the first shadowing pass and subsequent interreflection passes to produce total radiance transfer for the sample point; and
rendering a viewable image on an output device based at least in art on the radiance self transfer data.

4. The method of claim 3 wherein the criteria is the total interreflection illumination energy of the current interreflection pass falls below a threshold level.

5. The method of claim 3 further comprising representing the radiance transfer data for a sample point on a diffuse surface of the modeled object as a vector of spherical harmonic basis coefficients.

6. The method of claim 3 further comprising representing the radiance transfer data for a sample point on a glossy surface of the modeled object as a matrix of spherical harmonic basis coefficients.

7. A method for real-time rendering of computer graphics images of a surface on a geometrically modeled object, the method comprising:
in a radiance transfer pre-computation phase performed on a first computer: performing an illumination simulation of the modeled object in a reference low-frequency lighting environment to calculate radiance transfer, including global transport effects, for a plurality of sample points on the modeled object, the simulation incorporating self shadowing and inter-reflections of the modeled object; and
in the case of a sample point on a diffuse surface of the modeled object, recording the calculated radiance transfer as a radiance transfer vector of spherical harmonic basis coefficients;
in the case of a sample point on a glossy surface of the modeled object, recording the calculated radiance transfer as a radiance transfer matrix of spherical harmonic coefficients;
in an image rendering phase performed on a second computer, rendering an image of the modeled object, said rendering comprising:
sampling source light for the modeled object in a rendering-time lighting environment to yield source radiance vectors in spherical harmonic basis coefficients for the sample points on the modeled object;
in the case of a sample point on a diffuse surface of the modeled object, performing a dot-product of the source radiance vector and the radiance transfer vector to yield exit radiance in a viewing direction;
in the case of a sample point on a glossy surface of the modeled object,
determining exit radiance for a viewing direction based on the source radiance vector, the radiance transfer matrix and a bi-directional reflectance distribution function for the glossy surface;
shading the modeled object at the sample points based on the exit radiance in the viewing direction for the respective sample points; and
rendering a viewable image of the modeled object with the shading on an output device.

8. The method of claim 7 wherein determining exit radiance for the viewing direction comprises:
multiplying the source radiance vector and the radiance transfer matrix; and evaluating a convolution of the product of the source radiance vector and the radiance transfer matrix with a bi-directional reflectance distribution function for the glossy surface at the sample point for the viewing direction to yield exit radiance in the viewing direction.

9. The method of claim 7 further comprising, in an image rendering phase performed on a second computer:
selecting the rendering-time lighting environment under user control; and
rendering further images of the modeled object for various user control-selected lighting environments.

10. The method of claim 7 further comprising, in an image rendering phase performed on a second computer:
varying the viewing direction under user control; and
rendering further images of the modeled object for various user-controlled viewing directions.

11. A computer graphics image rendering system for real-time rendering of computer graphics images of a glossy surface on a geometrically modeled object, the system comprising:
computing means for projecting radiance under a lighting environment to a spherical harmonic basis to produce a lighting coefficient vector for at least one location of the modeled object;
computing means for determining exiting radiance for a viewing direction from at least one location on the glossy surface as a function of the lighting coefficient vector, a pre-computed radiance transfer matrix data representing radiance response including global transport effects of the glossy surface at the at least one location to source light under a reference low-frequency lighting environment, and a bi-directional reflectance distribution function for the at least one location;
computing means for calculating shading of the glossy surface of the modeled object at the at least one location; and
means for producing an image of the glossy surface of the modeled object with the shading;
wherein determining exiting radiance for a viewing direction comprises:
performing a matrix-vector multiplication of the lighting coefficient vector with a pre-computed radiance transfer matrix for at least one location on the glossy surface, the pre-computed radiance transfer matrix representing radiance response including global transport effects of the glossy surface at the at least one location to source light under the reference low-frequency lighting environment;
convolving a resulting product of the matrix-vector multiplication with a bi-directional reflectance distribution function for the location on the glossy surface of the modeled object; and
evaluating a result of the convolving for a viewing direction.

12. A computer graphics image rendering system for real-time rendering of computer graphics images of a glossy surface on a geometrically modeled object, the system comprising:

computing means for projecting radiance under a lighting environment to a spherical harmonic basis to produce a lighting coefficient vector for at least one location of the modeled object;

computing means for determining exiting radiance for a viewing direction from at least one location on the glossy surface as a function of the lighting coefficient vector, a pre-computed radiance transfer matrix data representing radiance response including global transport effects of the glossy surface at the at least one location to source light under a reference low-frequency lighting environment, and a bi-directional reflectance distribution function for the at least one location;

computing means for calculating shading of the glossy surface of the modeled object at the at least one location; and means for producing an image of the glossy surface of the modeled object with the shading;

wherein determining exiting radiance for a viewing direction comprises:

computing the exiting radiance based on a matrix-vector multiplication of the lighting coefficient vector with a pre-computed radiance transfer matrix for at least one location on the glossy surface, the pre-computed radiance transfer matrix representing radiance response including global transport effects of the glossy surface at the at least one location to source light under the reference low-frequency lighting environment.

13. A computer graphics image rendering system for producing radiance self transfer data representing radiance response including global transport effects for use in real-time rendering and display of computer graphics images of a modeled object, the system comprising:

processing means for performing a global illumination simulation over the modeled object for a reference lighting environment represented as a linear combination of area-supported basis functions, the simulation calculating radiance transfer for a plurality of sample points on the modeled object, the simulation incorporating self-shadowing and inter-reflections of the modeled object;

processing means for recording the global illumination simulation for the plurality of sample points as a linear transformation of the area-supported basis functions' coefficients for use in rendering radiance transfer over the modeled object to produce graphical images of the modeled object;

processing means for performing the global illumination simulation in multiple passes over the modeled object, where, in a first shadowing pass, simulating direct illumination of a plurality of sample points on the modeled object including self shadowing of the modeled object, the direct illumination simulating comprising, for a sample point, evaluating a plurality of directions from the sample point within a hemisphere about a normal direction to a surface of the modeled object at the sample point;

tagging those directions from the sample point that intersect the modeled object as being occluded;

accumulating radiance transfer from direct illumination of the sample point in the directions to produce radiance transfer data for the sample point; and in subsequent interreflection passes, simulating interreflection illumination of the sample points on the modeled object, the interreflection illumination simulating comprising, for a sample point, accumulating radiance transfer from interreflected illumination of the sample point in the directions tagged as occluded to produce radiance transfer data for the sample point;

repeating interreflection passes until a criteria is met; and summing for a sample point the radiance transfer data accumulated in the first shadowing pass and subsequent interreflection passes to produce total radiance transfer for the sample point.

14. The system of claim 13 wherein the criteria is the total interreflection illumination energy of the current interreflection pass falls below a threshold level.

15. The system of claim 13 further comprising processing means for representing the radiance transfer data for a sample point on a diffuse surface of the modeled object as a vector of spherical harmonic basis coefficients.

16. The system of claim 13 further comprising processing means for representing the radiance transfer data for a sample point on a glossy surface of the modeled object as a matrix of spherical harmonic basis coefficients.

17. A computer graphics image rendering system for real-time rendering of computer graphics images of a surface on a geometrically modeled object, the system comprising:

a first computer operational to perform, in a radiance transfer pre-computation phase:

performing an illumination simulation of the modeled object in a reference low-frequency lighting environment to calculate radiance transfer, including global transport effects, for a plurality of sample points on the modeled object, the simulation incorporating self-shadowing and inter-reflections of the modeled object; and in the case of a sample point on a diffuse surface of the modeled object, recording the calculated radiance transfer as a radiance transfer vector of spherical harmonic basis coefficients;

in the case of a sample point on a glossy surface of the modeled object, recording the calculated radiance transfer as a radiance transfer matrix of spherical harmonic coefficients;

a second computer operational to perform, in an image rendering phase, rendering an image of the modeled object, said rendering comprising:

sampling source light for the modeled object in a rendering-time lighting environment to yield source radiance vectors in spherical harmonic basis coefficients for the sample points on the modeled object;

in the case of a sample point on a diffuse surface of the modeled object, performing a dot-product of the source radiance vector and the radiance transfer vector to yield exit radiance in a viewing direction;

in the case of a sample point on a glossy surface of the modeled object, determining exit radiance for a viewing direction based on the source radiance vector, the radiance transfer matrix and a bi-directional reflectance distribution function for the glossy surface;

shading the modeled object at the sample points based on the exit radiance in the viewing direction for the respective sample points.

18. The system of claim 17 wherein determining exit radiance for the viewing direction comprises:
    multiplying the source radiance vector and the radiance transfer matrix; and
    evaluating a convolution of the product of the source radiance vector and the radiance transfer matrix with a bi-directional reflectance distribution function for the glossy surface at the sample point for the viewing direction to yield exit radiance in the viewing direction.

19. The system of claim 17 wherein the second computer is further operational to perform, in the image rendering phase:
    selecting the rendering-time lighting environment under user control; and
    rendering further images of the modeled object for various user control-selected lighting environments.

20. The system of claim 17 wherein the second computer is further operational to perform, in the image rendering phase:
    varying the viewing direction under user control; and
    rendering further images of the modeled object for various user-controlled viewing directions.

21. A computer-readable data storage medium having program code stored thereon and executable on a graphics image processing device to perform a method for real-time rendering of computer graphics images of a glossy surface on a geometrically modeled object, wherein the computer-readable data storage medium comprises a physical storage medium for data storage, the method comprising:
    projecting radiance under a lighting environment to a spherical harmonic basis to produce a lighting coefficient vector for at least one location of the modeled object;
    determining exiting radiance for a viewing direction from at least one location on the glossy surface as a function of the lighting coefficient vector, a pre-computed radiance transfer matrix data representing radiance response including global transport effects of the glossy surface at the at least one location to source light under a reference low-frequency lighting environment, and a bi-directional reflectance distribution function for the at least one location;
    calculating shading of the glossy surface of the modeled object at the at least one location; and
    producing an image of the glossy surface of the modeled object with the shading;
    wherein determining exiting radiance for a viewing direction comprises:
        performing a matrix-vector multiplication of the lighting coefficient vector with a pre-computed radiance transfer matrix for at least one location on the glossy surface, the pre-computed radiance transfer matrix representing radiance response including global transport effects of the glossy surface at the at least one location to source light under the reference low-frequency lighting environment;
        convolving a resulting product of the matrix-vector multiplication with a bi-directional reflectance distribution function for the location on the glossy surface of the modeled object; and
        evaluating a result of the convolving for a viewing direction.

22. A computer-readable data storage medium having program code stored thereon and executable on a graphics image processing device to perform a method for real-time rendering of computer graphics images of a glossy surface on a geometrically modeled object, wherein the computer-readable data storage medium comprises a physical storage medium for data storage, the method comprising:
    projecting radiance under a lighting environment to a spherical harmonic basis to produce a lighting coefficient vector for at least one location of the modeled object;
    determining exiting radiance for a viewing direction from at least one location on the glossy surface as a function of the lighting coefficient vector, a pre-computed radiance transfer matrix data representing radiance response including global transport effects of the glossy surface at the at least one location to source light under a reference low-frequency lighting environment, and a bi-directional reflectance distribution function for the at least one location;
    calculating shading of the glossy surface of the modeled object at the at least one location; and
    producing an image of the glossy surface of the modeled object with the shading;
    wherein determining exiting radiance for a viewing direction comprises:
        computing the exiting radiance based on a matrix-vector multiplication of the lighting coefficient vector with a pre-computed radiance transfer matrix for at least one location on the glossy surface, the pre-computed radiance transfer matrix representing radiance response including global transport effects of the glossy surface at the at least one location to source light under the reference low-frequency lighting environment.

23. A computer-readable data storage medium having program code stored thereon and executable on a graphics image processing device to perform a method for producing radiance self transfer data representing radiance response including global transport effects for use in real-time rendering and display of computer graphics images of a modeled object, wherein the computer-readable data storage medium comprises a physical storage medium for data storage, the method comprising:
    performing a global illumination simulation over the modeled object for a reference lighting environment represented as a linear combination of area-supported basis functions, the simulation calculating radiance transfer for a plurality of sample points on the modeled object, the simulation incorporating self-shadowing and inter-reflections of the modeled object;
    recording the global illumination simulation for the plurality of sample points as a linear transformation of the area-supported basis functions' coefficients for use in rendering radiance transfer over the modeled object to produce graphical images of the modeled object;
    performing the global illumination simulation in multiple passes over the modeled object;
    in a first shadowing pass, simulating direct illumination of a plurality of sample points on the modeled object including self-shadowing of the modeled object, the direct illumination simulating comprising, for a sample point,
        evaluating a plurality of directions from the sample point within a hemisphere about a normal direction to a surface of the modeled object at the sample point;
    tagging those directions from the sample point that intersect the modeled object as being occluded;

accumulating radiance transfer from direct illumination of the sample point in the directions to produce radiance transfer data for the sample point; and in subsequent interreflection passes, simulating interreflection illumination of the sample points on the modeled object, the interreflection illumination simulating comprising, for a sample point, accumulating radiance transfer from interreflected illumination of the sample point in the directions tagged as occluded to produce radiance transfer data for the sample point;

repeating interreflection passes until a criteria is met; and summing for a sample point the radiance transfer data accumulated in the first shadowing pass and subsequent interreflection passes to produce total radiance transfer for the sample point.

24. The storage medium of claim 23 wherein the criteria is the total interreflection illumination energy of the current interreflection pass falls below a threshold level.

25. The storage medium of claim 23 wherein the method further comprises representing the radiance transfer data for a sample point on a diffuse surface of the modeled object as a vector of spherical harmonic basis coefficients.

26. The storage medium of claim 23 wherein the method further comprises representing the radiance transfer data for a sample point on a glossy surface of the modeled object as a matrix of spherical harmonic basis coefficients.

27. A computer-readable data storage medium having program code stored thereon and executable on a graphics image processing device to perform a method for real-time rendering of computer graphics images of a surface on a geometrically modeled object, wherein the computer-readable data storage medium comprises a physical storage medium for data storage, the method comprising:

in a radiance transfer pre-computation phase performed on a first computer:

performing an illumination simulation of the modeled object in a reference low-frequency lighting environment to calculate radiance transfer, including global transport effects, for a plurality of sample points on the modeled object, the simulation incorporating self shadowing and inter-reflections of the modeled object; and in the case of a sample point on a diffuse surface of the modeled object, recording the calculated radiance transfer as a radiance transfer vector of spherical harmonic basis coefficients;

in the case of a sample point on a glossy surface of the modeled object, recording the calculated radiance transfer as a radiance transfer matrix of spherical harmonic coefficients;

in an image rendering phase performed on a second computer, rendering an image of the modeled object, said rendering comprising:

sampling source light for the modeled object in a rendering-time lighting environment to yield source radiance vectors in spherical harmonic basis coefficients for the sample points on the modeled object;

in the case of a sample point on a diffuse surface of the modeled object, performing a dot-product of the source radiance vector and the radiance transfer vector to yield exit radiance in a viewing direction;

in the case of a sample point on a glossy surface of the modeled object, determining exit radiance for a viewing direction based on the source radiance vector, the radiance transfer matrix and a hi-directional reflectance distribution function for the glossy surface;

shading the modeled object at the sample points based on the exit radiance in the viewing direction for the respective sample points.

28. The storage medium of claim 27 wherein determining exit radiance for the viewing direction comprises:

multiplying the source radiance vector and the radiance transfer matrix; and evaluating a convolution of the product of the source radiance vector and the radiance transfer matrix with a bi-directional reflectance distribution function for the glossy surface at the sample point for the viewing direction to yield exit radiance in the viewing direction.

29. The storage medium of claim 27 wherein the method further comprises, in an image rendering phase performed on a second computer:

selecting the rendering-time lighting environment under user control; and rendering further images of the modeled object for various user control-selected lighting environments.

30. The storage medium of claim 27 wherein the method further comprises, in an image rendering phase performed on a second computer:

varying the viewing direction under user control; and rendering further images of the modeled object for various user-controlled viewing directions.

* * * * *